(12) United States Patent
Nishio et al.

(10) Patent No.: US 9,326,272 B2
(45) Date of Patent: Apr. 26, 2016

(54) BASE STATION, TERMINAL, TRANSMISSION METHOD, AND RECEPTION METHOD

(75) Inventors: Akihiko Nishio, Kanagawa (JP); Seigo Nakao, Kanagawa (JP); Ayako Horiuchi, Kanagawa (JP); Hidenori Matsuo, Kanagawa (JP); Daichi Imamura, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 128 days.

(21) Appl. No.: 13/818,417

(22) PCT Filed: Aug. 19, 2011

(86) PCT No.: PCT/JP2011/004629
§ 371 (c)(1),
(2), (4) Date: Feb. 22, 2013

(87) PCT Pub. No.: WO2012/029244
PCT Pub. Date: Mar. 8, 2012

(65) Prior Publication Data
US 2013/0148623 A1    Jun. 13, 2013

(30) Foreign Application Priority Data
Sep. 3, 2010    (JP) .................................. 2010-197765

(51) Int. Cl.
*H04W 72/04*    (2009.01)
*H04L 1/18*    (2006.01)
(Continued)

(52) U.S. Cl.
CPC ........... *H04W 72/0406* (2013.01); *H04L 1/004* (2013.01); *H04L 1/1896* (2013.01);
(Continued)

(58) Field of Classification Search
CPC ..... H04W 72/02; H04W 72/04; H04W 72/08; H04J 11/00; H04L 1/0038; H04L 1/004; H04L 1/0056; H04L 1/1896; H04L 5/0053; H04L 5/0073; H04B 7/04
USPC ......................................... 370/329; 455/452
See application file for complete search history.

(56) References Cited

U.S. PATENT DOCUMENTS

2010/0034077 A1    2/2010    Ishii et al.
2010/0034182 A1    2/2010    Sekiya et al.
(Continued)

FOREIGN PATENT DOCUMENTS

CN    101663849 A    3/2010
JP    2009-206790 A    9/2009
(Continued)

OTHER PUBLICATIONS

Panasonic, R-PDCCH placement, 3GPP TSG RAN WG1 Meeting #61, Montreal, Canada, May 10-14, 2010, R1-102881.*
(Continued)

*Primary Examiner* — Chi H Pham
*Assistant Examiner* — Shailendra Kumar
(74) *Attorney, Agent, or Firm* — Pearne & Gordon LLP

(57) ABSTRACT

Provided are a base station, a terminal whereby erroneous detection of control information can be reduced to prevent the degradation of the system throughput. A PDCCH generation unit (104) forms a downstream allocation control information unit (i.e., DCI) including cyclic redundant check (CRC) bits, which have been masked or scrambled by use of ID information of a terminal (200), and further including a bit sequence (i.e., virtual CRC) known between the terminal (200) and the base station; and an allocation unit (108) and a multiplex unit (109) map the formed DCI to a resource region (i.e., R-PD-CCH region) that can be used as any one of a downstream control channel region and a downstream data channel region. That is, the PDCCH generation unit (104) includes the virtual CRC into the DCI only when the DCI addressed to the terminal (200) is mapped to the R-PDCCH region.

15 Claims, 14 Drawing Sheets

(51) Int. Cl.
*H04L 5/00* (2006.01)
*H04L 1/00* (2006.01)
*H04B 7/04* (2006.01)

(52) U.S. Cl.
CPC ............ *H04L5/0053* (2013.01); *H04B 7/04* (2013.01); *H04L 1/0038* (2013.01); *H04L 1/0056* (2013.01); *H04L 5/0073* (2013.01); *H04W 72/042* (2013.01)

(56) References Cited

U.S. PATENT DOCUMENTS

| | | | |
|---|---|---|---|
| 2011/0064159 A1* | 3/2011 | Ko | H04B 7/04 375/267 |
| 2011/0116428 A1* | 5/2011 | Seong | H01L 1/0038 370/311 |
| 2011/0199999 A1* | 8/2011 | Nakao | H04L 5/003 370/329 |

FOREIGN PATENT DOCUMENTS

| | | |
|---|---|---|
| JP | 2010-41596 A | 2/2010 |
| WO | 2010/050232 A1 | 5/2010 |

OTHER PUBLICATIONS

Samsung, R-PDCCH multiplexing, 3GPP TSG RAN WG1 Meeting #61, May 10-14, 2010, Montreal, Canada, R1-103041.*

NEC Group, Supporting frequency diversity and frequency selective R-PDCCH, 3GPP TSG RAN WG1 Meeting #61, Montreal, Canada, May 10-14, 2010, R1-103062.*

NTT DOCOMO, "Offline discussion summary and porposed way forward on R2-085662", 3GPP TSG RAN WG2 Meeting #63bis, Sep. 29-Oct. 3, 2008, Prague, Czech Republic, R2-085936.*

3GPP TS 36.211 V8.7.0, "Physical Channels and Modulation (Release 8)," Sep. 2008.

3GPP TS 36.212 V8.7.0, "Multiplexing and channel coding (Release 8)," Sep. 2008.

3GPP TS 36.213 V8.7.0, "Physical layer procedures (Release 8)," Sep. 2008.

3GPP TSG RAN WG1 meeting, R1-102700, "Backhaul Control Channel Design in Downlink," May 2010.

3GPP TSG RAN WG1 meeting, R1-102881, "R-PDCCH placement," May 2010.

3GPP TSG RAN WG1 meeting, R1-103040, "R-PDCCH search space design" May 2010.

3GPP TSG RAN WG1 meeting, R1-103062, "Supporting frequency diversity and frequency selective R-PDCCH transmissions" May 2010.

International Search Report for PCT/JP2011/004629 dated Sep. 13, 2011.

English translation of the Search Report for Chinese Application No. 2011800410000 dated Mar. 3, 2015.

* cited by examiner

BASE STATION, TERMINAL, TRANSMISSION METHOD, AND RECEPTION METHOD

TECHNICAL FIELD

The claimed invention relates to a base station, a terminal, a method of transmission, and a method of reception.

BACKGROUND ART

In 3rd generation partnership project radio access network long term evolution (3GPP-LTE) (hereinafter, referred to as "LTE"), orthogonal frequency division multiple access (OFDMA) is adopted as a downlink communication scheme, and single carrier frequency division multiple access (SC-FDMA) is adopted as an uplink communication scheme (e.g., see Non-Patent Literatures 1, 2 and 3.)

In LTE, a radio communication base station apparatus (hereinafter, abbreviated as "base station") communicates with a radio communication terminal apparatus (hereinafter, abbreviated as "terminal") through allocation of resource blocks (RBs) in a system band to terminals, per time unit referred to as "subframe." The base station also transmits, to the terminal, downlink control information (i.e., L1/L2 control information) to notify the result of resource allocation for downlink data and uplink data. This downlink control information is transmitted to terminals through downlink control channels, such as physical downlink control channel (PDCCH). Each PDCCH occupies a resource composed of one or more contiguous control channel elements (CCEs). In LTE, the number of CCEs (i.e., the number of connected CCEs) (hereinafter, referred to as "CCE aggregation level") occupied by the PDCCH is set by selecting one of the numbers 1, 2, 4, and 8, depending on the number of information bits in downlink control information or the condition of propagation paths of the terminal. LTE supports a frequency band with a maximum width of 20 MHz as a system bandwidth.

Allocation control information transmitted from a base station is referred to as downlink control information (DCI). The base station transmits a plurality of pieces of DCI at the same time when allocating a plurality of terminals to a single subframe. In this case, the base station includes CRC bits, which are masked (or scrambled) with each ID of destination terminals, in each piece of DCI in order to identify each destination terminal of the DCI, and transmits the DCI. Then, the terminal performs blind decoding on a plurality of pieces of DCI, which may be addressed to the terminal by demasking (or descrambling) the CRC bits with a terminal ID of the terminal, and detects the DCI addressed to the terminal.

In addition, DCI includes modulation and channel coding scheme (MCS) and information on resource allocated to a terminal by a base station (i.e., resource allocation information), for example. DCI also has a plurality of formats, such as a format for uplink, a format for downlink multiple input multiple output (MIMO) transmission, a format for downlink non-contiguous band allocation, for example. Accordingly, a terminal is required to receive both of downlink allocation control information including a plurality of formats (i.e., allocation control information related to downlink) and uplink allocation control information including a single format (allocation control information related to uplink).

For example, in the downlink allocation control information, a plurality of different size formats is defined depending on, for example, a method of controlling a transmission antenna and a method of allocating resources of a base station. In the plurality of formats, a downlink allocation control information format (hereinafter, simply referred to as "downlink allocation control information") used for performing band allocation of allocating RBs with continuous numbers (hereinafter, referred to as "contiguous band allocation"), has the same size as an uplink allocation control information format (hereinafter, simply referred to as "uplink allocation control information") used for performing contiguous band allocation. These formats (i.e., DCI formats) include type information (e.g., a flag of one bit) indicating the type of allocation control information (i.e., downlink allocation control information or uplink allocation control information). Thus, the terminal can specify whether the DCI is downlink allocation control information or uplink allocation control information, through confirmation of the type information included in the allocation control information, even when the DCI indicating the downlink allocation control information has the same size as the DCI indicating uplink allocation control information.

The DCI format, of when the uplink allocation control information used for performing the contiguous band allocation is transmitted, is referred to as DCI format 0 (hereinafter, referred to as "DCI 0"), and the DCI format, of when the downlink allocation control information used for performing the contiguous band allocation is transmitted, is referred to as DCI format 1A (hereinafter, referred to as "DCI 1A"). As described above, DCI 0 and DCI 1A have the same size and can be distinguished according to the type information, and therefore DCI 0 and DCI 1A are expressed as "DCI 0/1A" together in the following explanation.

Other than the above described DCI formats, the downlink also involves: DCI format 1 (hereinafter, referred to as "DCI 1") used for performing band allocation of allocating RBs with discontinuous numbers (hereinafter, referred to as "non-contiguous band allocation"); DCI formats 2 and 2A (hereinafter, referred to as "DCI 2, 2A") used for allocating spatial multiplexing MIMO transmission; the format of downlink allocation control information (i.e., "beam forming allocation downlink format," hereinafter referred to as "DCI format 1B") used for allocating beam forming transmission; and the format of downlink allocation control information (i.e., "multiuser MIMO allocation downlink format," hereinafter referred to as "DCI format 1D") used for allocating multiuser MIMO transmission, for example. DCIs 1, 2, 2A, 1B, and 1D are formats used depending on downlink transmission modes of terminals (i.e., non-contiguous band allocation, spatial multiplexing MIMO transmission, beam forming transmission, and multiuser MIMO transmission) and set for each terminal. In contrast, DCI 0/1A does not depend on the transmission modes and can be used for a terminal in any transmission mode, i.e., can be used commonly used for all terminals. When DCI 0/1A is used, single-antenna transmission or transmit diversity is adopted as a default transmission mode. In contrast, studies are underway to use DCI format 0A used for performing non-contiguous band allocation and DCI format 0B used for allocating spatial multiplexing MIMO transmission, as formats for uplink allocation. Those formats are set for each terminal.

In addition, a method of limiting CCEs, which are targeted for blind decoding, for each terminal has been discussed for the purpose of reducing the number of blind decoding attempts in order to decrease the circuit scale of a terminal. This method limits a CCE region that may be a target of the blind decoding performed by each terminal (hereinafter, referred to as "search space"). A unit of the CCE region allocated to each terminal (i.e., equivalent to a unit targeted for the blind decoding) is referred to as "downlink control information allocation region candidate (i.e., DCI allocation region candidate)" or "decoding-target unit region candidate."

In LTE, a search space is randomly set for each terminal. The number of CCEs forming the search space is defined per a CCE aggregation level of PDCCH. For example, the numbers of CCEs forming the search space are 6, 12, 8, and 16, corresponding to the CCE aggregation levels of PDCCHs 1, 2, 4, and 8, respectively. In this case, the numbers of decoding-target unit region candidates are six (6=6÷1), six (6=12÷2), two (2=8÷4), and two (2=16÷8), corresponding to the CCE aggregation levels of PDCCHs 1, 2, 4, and 8, respectively. In other words, the number of decoding-target unit region candidates is limited to sixteen in total. Consequently, the number of blind decoding attempts can be reduced since each terminal needs to perform the blind decoding on only a decoding-target unit region candidate group in the search space allocated to the terminal. In this case, the search space of each terminal is set using a terminal ID of each terminal and a hash function of performing randomization. This terminal-specific CCE region is referred to as "UE specific search space (UE-SS)."

Meanwhile, PDCCH also includes control information that is notified to a plurality of terminals at the same time and is used for data allocation common to all terminals (e.g., allocation information on downlink broadcast signals and allocation information on paging signals) (hereinafter, referred to as "control information for a common channel"). A CCE region common to all terminals that need to receive the downlink broadcast signals (hereinafter, referred to as "common search space (C-SS)") is used for PDCCH, in order to transmit the control information for a common channel. In C-SS, only six decoding-target unit region candidates exist in total, i.e., four candidates (4=16÷4) and two candidates (2=16÷8), corresponding to CCE aggregation levels 4 and 8, respectively.

In UE-SS, a terminal performs blind decoding on two DCI formats having different sizes, i.e., DCI format commonly used for all terminals (DCI 0/1A) and DCI format depending on a transmission mode (one of DCIs 1, 2, and 2A). For example, in UE-SS, the terminal performs the blind decoding sixteen times as described above on each of the two DCI formats having different sizes. The transmission mode notified from a base station determines which two DCI formats having different sizes are processed through blind decoding. In C-SS, the terminal performs the blind decoding six times as described above on each of DCI 1A and DCI format 1C (i.e., twelve times of blind decoding in total), which is the format for common channel allocation (hereinafter, referred to as "DCI 1C"), regardless of the notified transmission mode. In other words, the terminal performs the blind decoding forty-four times in total on a subframe basis.

DCI 1A used for a common channel allocation has the same size as DCI 0/1A used for data allocation of an individual terminal, and they are distinguished by a terminal TD. Accordingly, even in C-SS, a base station can transmit DCI 0/1A used for terminal-specific data allocation without increasing the number of blind decoding attempts in the terminal.

In the meantime, the standardization of 3GPP LTE-Advanced (hereinafter, referred to as "LTE-A"), which achieves faster communication than LTE, has been started. In LTE-A, introducing a base station and a terminal (hereinafter, referred to as "LTE-A terminal") that can communicate with each other through a wideband frequency of 40 MHz or more is expected in order to achieve the maximum downlink transmission speed of 1 Gbps or more and the maximum uplink transmission speed of 500 Mbps or more. An LTE-A system is required to accommodate not only LTE-A terminals but also terminals supporting an LTE system (hereinafter, referred to as "LTE terminals").

Furthermore, in LTE-A, introducing a radio communication relay apparatus (hereinafter, referred to as "relay station" or "relay node (RN)") is defined in order to achieve enhancement of coverage (see, FIG. 1). Accordingly, standardization of downlink control channel from a base station to a relay station (hereinafter, referred to as "R-PDCCH") is advanced (e.g., see Non-Patent Literatures 4 to 7). The following matters about R-PDCCH are considered in the present stage. FIG. 2 shows an example R-PDCCH region.

(1) The position to start mapping in the time domain direction of R-PDCCH is fixed to the fourth OFDM symbol from the beginning of a single subframe. This position does not depend on the proportion of PDCCH in the time domain direction.

(2) Each R-PDCCH occupies a resource formed by a single or a plurality of contiguous relay-control channel elements (R-CCEs). The number of REs forming a single R-CCE differs depending on a slot or arrangement of reference signals. Specifically, in slot 0, R-CCE is defined as a resource region that has a range from the fourth OFDM symbol to the end of slot 0 in a time direction and has a width of 1 RB in a frequency direction (provided that regions on which reference signals are mapped are excluded). In slot 1, R-CCE is defined as a resource region that has a range from the start of slot 1 to the end of slot 1 in the time direction and has the width of 1 RB in the frequency direction (provided that regions on which reference signals are mapped are excluded). However, a proposal has also been made in which the above described resource region in slot 1 is divided into two parts and defining each part as a single R-CCE.

CITATION LIST

Patent Literature

NPL 1
3GPP TS 36.211 V8.7.0, "Physical Channels and Modulation (Release 8)," September 2008
NPL 2
3GPP TS 36.212 V8.7.0, "Multiplexing and channel coding (Release 8)," September 2008
NPL 3
3GPP TS 36.213 V8.7.0, "Physical layer procedures (Release 8)," September 2008
NPL 4
3GPP TSG RAN WG1 meeting, R1-102700, "Backhaul Control Channel Design in Downlink," May 2010
NPL 5
3GPP TSG RAN WG1 meeting, R1-102881, "R-PDCCH placement," May 2010
NPL 6
3GPP TSG RAN WG1 meeting, R1-103040, "R-PDCCH search space design" May 2010
NPL 7
3GPP TSG RAN WG1 meeting, R1-103062, "Supporting frequency diversity and frequency selective R-PDCCH transmissions" May 201.0

SUMMARY OF INVENTION

Technical Problem

Considering introduction of various devices for machine to machine (M2M) communication, for example, as radio communication terminals, in future, which leads to a fear that an increase in the number of terminals results in a resource shortage of the regions on which PDCCH is to be mapped (hereinafter, referred to as "PDCCH region"). When PDCCH cannot be mapped due to this resource shortage, downlink data allocation for terminals cannot be performed. Consequently, system throughput may be reduced since the resource region on which downlink data is to be mapped (hereinafter, referred to as "PDSCH region.") cannot be used even when the resource region is vacant. A possible method of resolving this resource shortage involves arranging the DCI addressed to terminals under a base station, also to a region on which the above described R-PDCCH is to be mapped (hereinafter, referred to as "R-PDCCH region") (see, FIG. 3).

In a heterogeneous network composed of a macro base station and femto/pico base station as shown in FIG. 4, it is feared that the interference in a PDCCH region in any cell increases due to influence from the other cells. For example, when terminals connected with a macro cell are located in the vicinity of a femto cell (i.e., especially when the terminals are not allowed to connect with a femto base station), the terminals are greatly interfered with by a femto cell. Additionally, when terminals connected to a pico cell are located in the vicinity of a cell edge of the pico cell (e.g., range expansion region), the terminals are greatly interfered with by a macro cell. Consequently, in the PDCCH region, the reception performance of control information in each terminal is deteriorated.

In the meantime, using R-PDCCH for transmitting DCI addressed to a terminal connected to a base station can minimize the deterioration of the reception performance of DCI. In other words, while a macro base station transmits DCI using specific RBs with low transmission power in order to enable terminals under a femto/pico base station to receive the DCI at a sufficiently low error rate, the femto/pico base station transmits DCI to the terminals under the femto/pico base station using the specific RBs. Consequently, the terminals connected to the femto/pico base station can receive the DCI at low error rate since receiving the DCI using RBs with low interference from the macro base station. In the similar way, the terminals connected to the macro base station can receive DCI at low error rate since the macro base station transmits the DCI using RBs with low interference from the femto/pico base station.

However, only simply adding an R-PDCCH region to a PDCCH region as a region to be used for transmitting DCI addressed to a terminal connected to a base station, causes a problem that an increase in the number of blind decoding attempts in the terminal results in an increase in power consumption and process delay and an increase in a circuit scale.

A desirable method for solving this problem is limiting the numbers of blind decoding attempts in both of PDCCH and R-PDCCH to be a predetermined value or less. For example, limiting the numbers of blind decoding attempts for respective two DCI formats targeted for blind decoding (e.g., DCI format 0/1A and DCI format 2) to be thirty-two times in total, i.e., eight times in PDCCH and eight times in R-PDCCH, can reduce the number of blind decoding attempts to the same number as that of LTE.

However, when the number of terminals increases, the probability that a false alarm (due to false detection of control information) occurs in a system increases. The false alarm (due to false detection of control information) indicates that a terminal detects DCI addressed to other terminals or signals that are not transmitted (i.e., noise component) as DCI addressed to the terminal. Hereinafter, simply referring to as "false detection" means this false alarm (due to false detection of control information). The occurrence of this false detection indicates a negative influence on the system as below. For example, in the case of false detection of uplink allocation control information, uplink data is transmitted, and thus the interference to other terminals is increased. Alternatively, in the case of false detection of downlink allocation control information, ACK/NACK is transmitted in uplink, and thus an error regarding ACK/NACK of other terminals may be caused. This reduces the system, throughput in uplink and downlink, and therefore decreasing the false alarm is required.

It is an object of the claimed invention to provide a base station, a terminal, a method of transmission, and a method of reception that can prevent reduction of system throughput through a decrease in false detection of control information.

Solution to Problem

According to an aspect of the claimed invention, the base station includes: a generation section that generates control information that includes both of a cyclic redundancy check (CRC) bit masked or scrambled by identification information of a terminal and a known bit known by the terminal; and a mapping section that maps the generated control information in a resource region available to both of a control channel and a data channel.

According to an aspect of the claimed invention, the terminal includes: a reception section that receives control information including both of a cyclic redundancy check (CRC) bit masked or scrambled by identification information of a destination terminal and a predetermined bit in a resource region available to both of a control channel and a data channel; and a determination section that determines that the control information is addressed to the terminal only when the predetermined bit is the same as a known bit known by the terminal.

According to an aspect of the claimed invention, the method of transmission includes: generating control information that includes both of a cyclic redundancy check (CRC) bit masked or scrambled by identification information of a terminal and a known bit known by the terminal; and mapping the generated control information in a resource region available to both of a control channel and a data channel.

According to an aspect of the claimed invention, the method of reception includes: receiving control information that includes both of a cyclic redundancy check (CRC) bit masked or scrambled by identification information of a destination terminal and a predetermined bit in a resource region available to both of a control channel and a data channel; and determining that the control information is addressed to the terminal when the predetermined bit is the same as a known bit known by the terminal.

Advantageous Effects of Invention

According to the claimed invention, it is possible to provide a base station, a terminal, a method of transmission, and a method of reception that can prevent reduction of system throughput through decreasing false detection of control information.

DESCRIPTION OF EMBODIMENT

Figure 1:
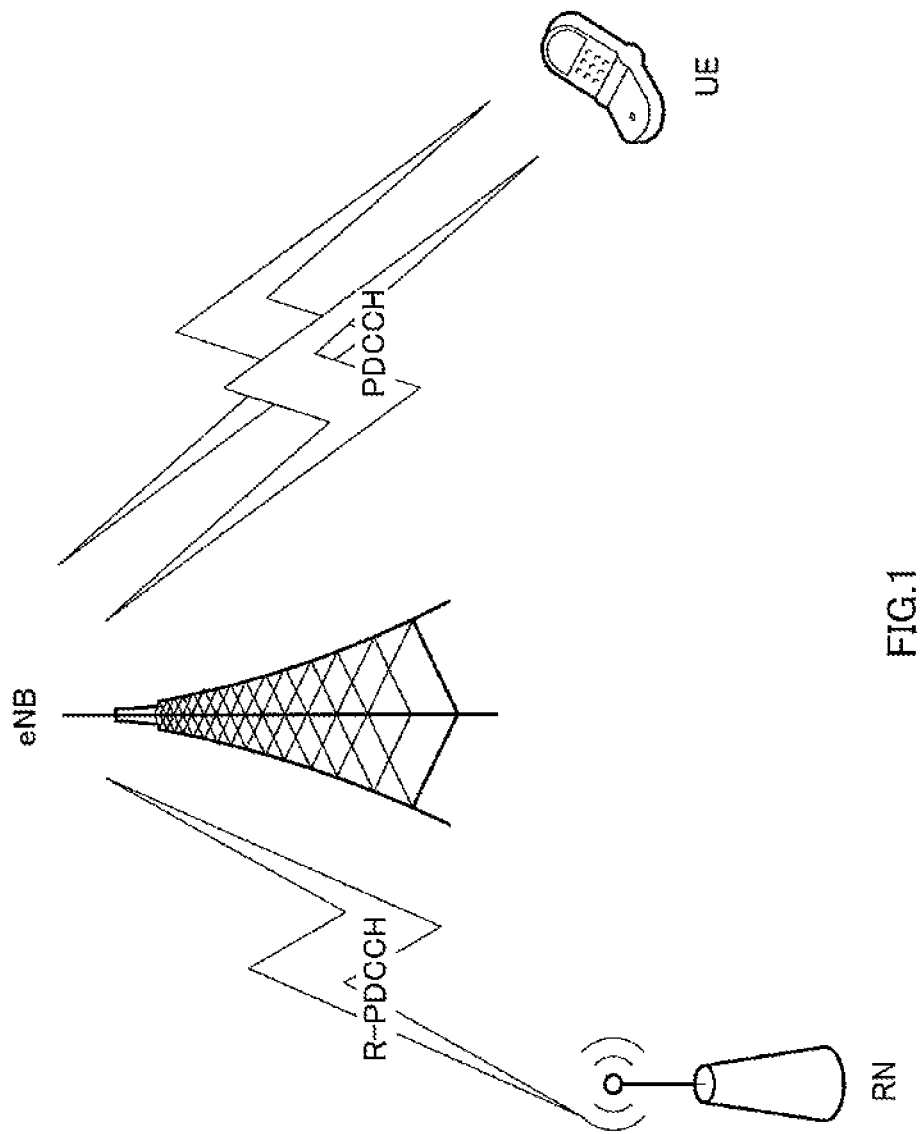
FIG. 1 explains a relay station.
Figure 2:
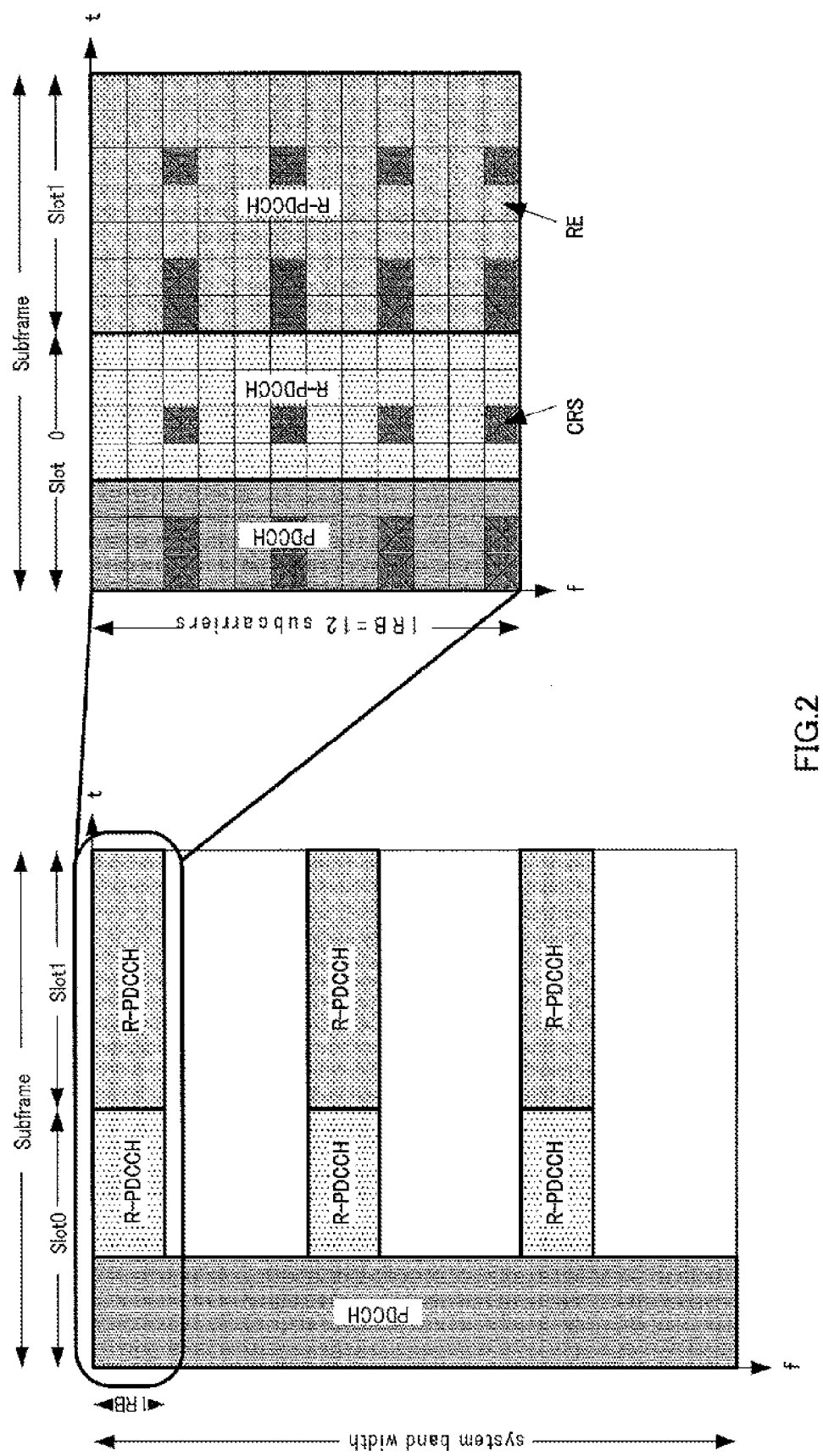
FIG. 2 shows an example R-PDCCH region.
Figure 3:
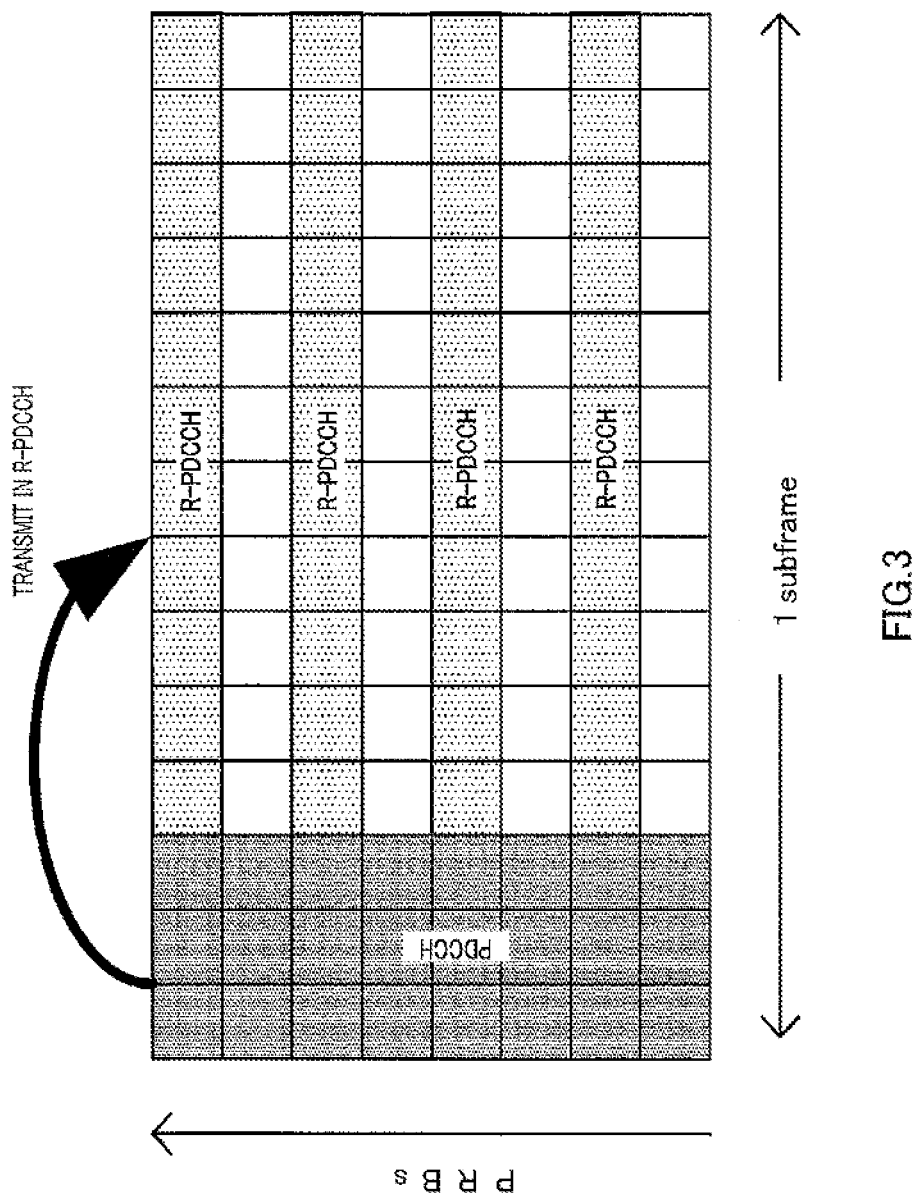
FIG. 3 explains R-PDCCH.
Figure 4:
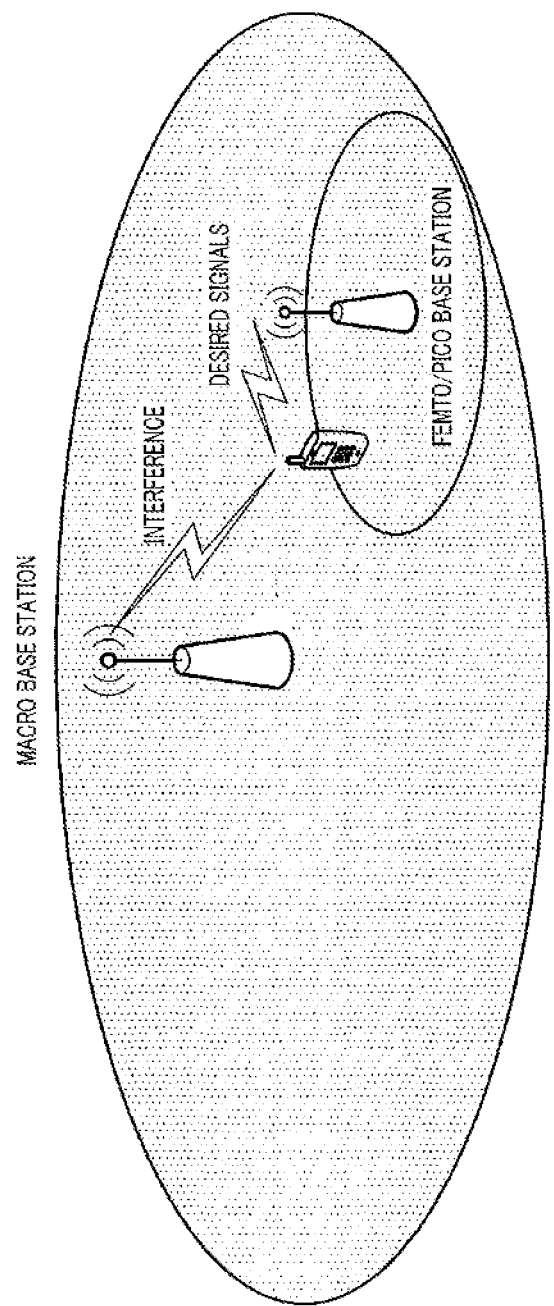
FIG. 4 explains a heterogeneous network.

Hereinafter, embodiments of the claimed invention will be described in detail with reference to the accompanying drawings. In the embodiments, the same components are denoted by the same reference numerals and their overlapping explanations are omitted.

Embodiment 1

[Summary of Communication System]

A communication system according to Embodiment 1 of the claimed invention includes base station 100 and terminal 200. Base station 100 is, for example, an LTE-A base station, and terminal 200 is, for example, an LTE-A terminal. Base station 100 maps downlink allocation control information (i.e., DCI) addressed to terminal 200 on a resource region available to both of a downlink control channel region and a downlink data channel region, for transmission.

Figure 5:
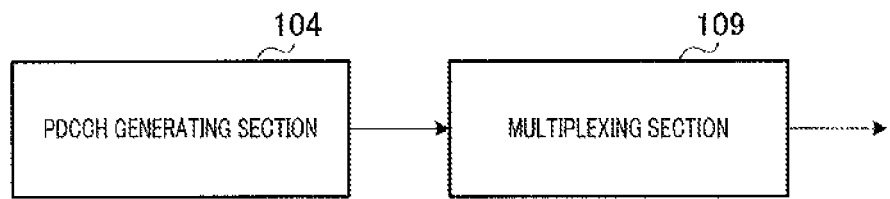
FIG. 5 is a main block diagram of a base station according to Embodiment 1 of the claimed invention.

FIG. 5 is a main block diagram of base station 100 according to Embodiment 1 of the claimed invention. In base station 100, PDCCH generating section 104 generates a downlink allocation control information unit (i.e., DCI) that includes both of cyclic redundancy check (CRC) bits masked or scrambled by identification information of terminal 200 and a bit sequence mutually known between base station 100 and terminal 200 (i.e., virtual CRC), and multiplexing section 109 maps the generated DCI on a resource region (i.e., R-PDCCH region) available to both of a downlink control channel region and a downlink data channel region. In other words, PDCCH generating section 104 includes the virtual CRC in the DCI only when mapping DCI addressed to terminal 200 on the R-PDCCH region.

Figure 6:
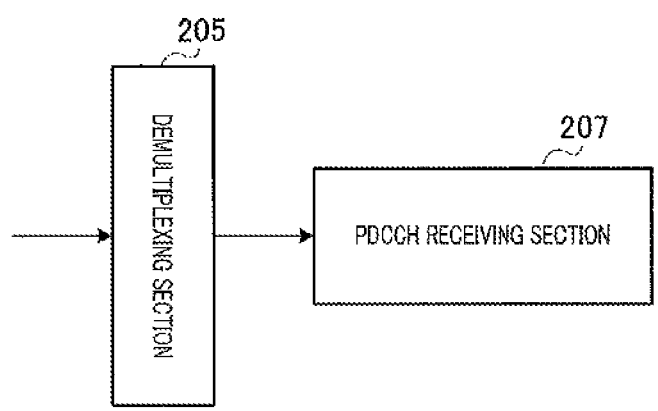
FIG. 6 is a main block diagram of a terminal according to Embodiment 1 of the claimed invention.

FIG. 6 is a main block diagram of terminal 200 according to Embodiment 1 of the claimed invention. In terminal 200, demultiplexing section 205 receives a downlink allocation control information unit (i.e., DCI) that includes both of cyclic redundancy check (CRC) bits masked or scrambled by identification information of the destination terminal, and a predetermined bit sequence, in a resource region (i.e., R-PDCCH region) available to both of a downlink control, channel region and a downlink data channel region, and PDCCH receiving section 207 determines that the received DCI is addressed to terminal 200 only when the predetermined bit sequence (i.e., virtual CRC) is the same as a criterion bit sequence held by terminal 200.

[Configuration of Base Station 100]

Figure 7:
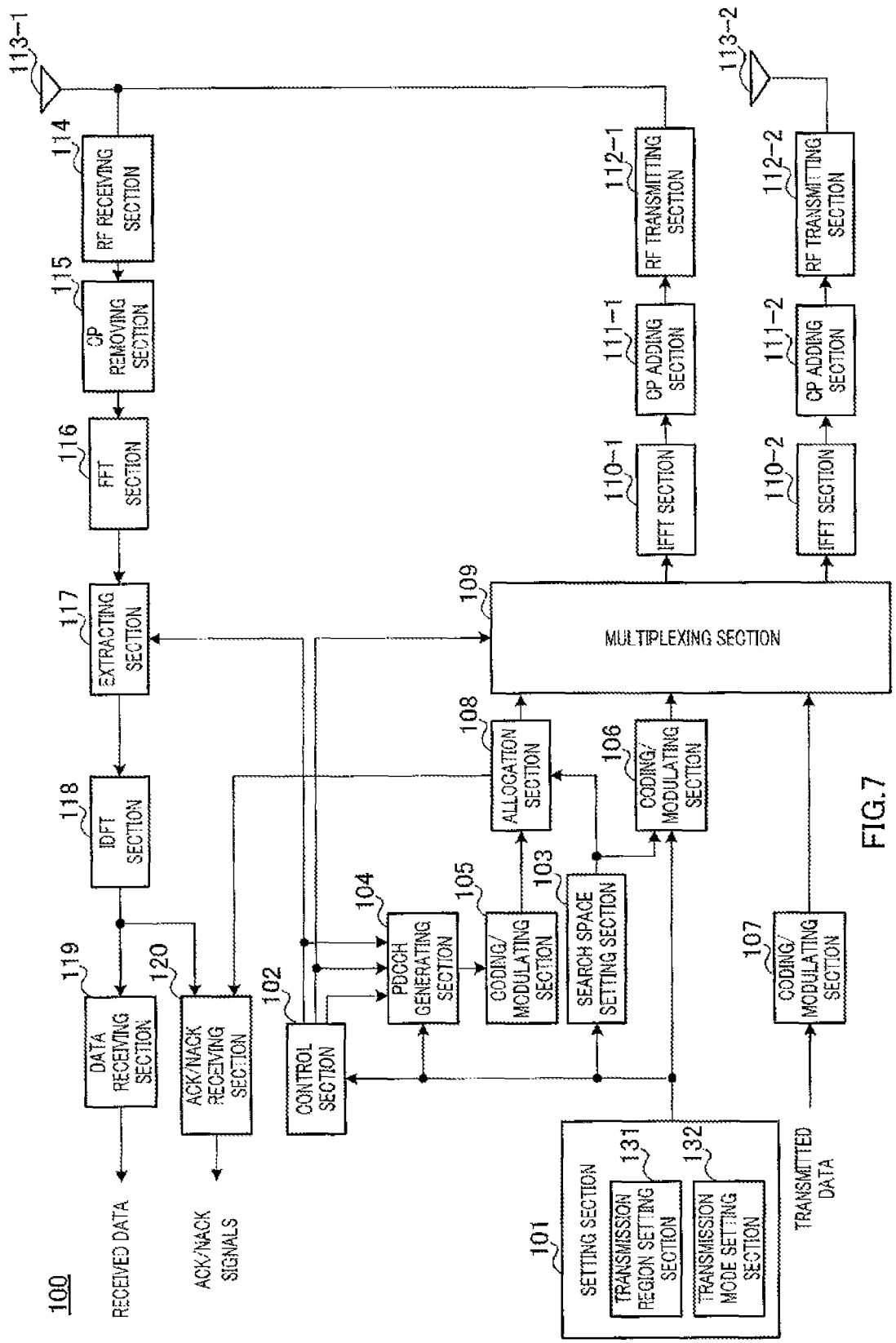
FIG. 7 is a block diagram showing a configuration of the base station according to Embodiment 1 of the claimed invention.

FIG. 7 is a block diagram showing a configuration of base station 100 according to Embodiment 1 of the claimed invention. In FIG. 7, base station 100 includes setting section 101, control section 102, search space setting section 103, PDCCH generating section 104, coding/modulating sections 105, 106, and 107, allocation section 108, multiplexing section 109, inverse fast fourier transform (IFFT) section 110, cyclic prefix (CP) adding section 111, RF transmitting section 112, antenna 113, RF receiving section 114, CP removing section 115, fast fourier transform (FFT) section 116, extracting section 117, inverse discrete fourier transform (IDFT) section 118, data receiving section 119, and ACK/NACK receiving section 120.

Setting section 101 sets a resource region used for transmitting DCI for terminal 200 (i.e., transmission region), and also sets each transmission mode of uplink and downlink of terminal 200. The resource region and the transmission mode are set for each terminal 200 targeted for setting. Setting information on the resource region and the transmission mode is outputted to control section 102, search space setting section 103, PDCCH generating section 104, and coding/modulating section 106.

Specifically, setting section 101 includes transmission region setting section 131 and transmission mode setting section 132.

Transmission region setting section 131 sets the resource region used for transmitting DCI for terminal 200. Candidates of the resource region to be set include a PDCCH region and an R-PDCCH region. In other words, transmission region setting section 131 sets whether or not to include the R-PDCCH region as a region of transmitting DCI (i.e., transmission region) in addition to the PDCCH region, for each terminal 200. For example, the PDCCH region is set for terminal 200 in normal times, and both of the PDCCH region and the R-PDCCH region (or only the R-PDCCH region) are set for terminal 200 when a large number of terminals 200 performing communication under base station 100 may cause a shortage of the PDCCH region or when it is determined that the interference in the PDCCH region is large. In other words, transmission region setting section 131 sets whether to perform blind decoding only on the PDCCH region or on both of the PDCCH region and the R-PDCCH region (or only on the R-PDCCH region), for each terminal 200. Any condition is available for determining whether or not a transmission region of DCI includes the R-PDCCH region in transmission region setting section 131. Transmission region setting section 131 sets an RB group targeted to be used as the R-PDCCH region used for transmitting DCI, in the whole RB groups. This RB group targeted to be used indicates the RB region targeted for blind decoding in terminal 200 when the DCI is transmitted in the R-PDCCH region.

Transmission mode setting section 132 sets a transmission mode (e.g., spatial multiplexing MIMO transmission, beam forming transmission, non-contiguous band allocation or the like) of each of uplink and downlink of terminal 200, based on the situation of a propagation path or the like of each terminal 200.

Setting section 101 outputs setting information, which includes information indicating the transmission region of DCI set for each terminal 200 and information indicating the transmission mode, to control section 102, search space setting section 103, PDCCH generating section 104, and coding/modulating section 106. The setting information on the resource region and the transmission mode is notified to each terminal 200 through coding/modulating section 106 as control information in the higher layer (hereinafter, referred to as "RRC control information" or "RRC signaling").

Control section 102 generates allocation control information depending on the setting information received from setting section 101.

Specifically, control section 102 generates allocation control information that includes HARQ-related information such as MCS information, resource (RB) allocating information, and new data indicator (NDI). The resource allocating information includes uplink resource allocating information that indicates an uplink resource to which uplink data of terminal 200 is allocated (e.g., physical uplink shared channel (PUSCH)) or downlink resource allocating information that indicates a downlink resource to which downlink data addressed to terminal 200 is allocated (e.g., physical downlink shared channel (PDSCH)).

Additionally, control section 102 generates allocation control information depending on a transmission mode of the uplink of terminal 200 (i.e., one of DCIs 0A and 0B), allocation control information depending on a transmission mode of the downlink (i.e., one of DCIs 1, 1B, 1D, 2, and 2A), or allocation control information common to all terminals (i.e., DCI 0/1A) for each terminal 200, based on the setting information received from setting section 101.

For example, in a normal data transmission, control section 102 generates allocation control information depending on the transmission mode of each terminal 200 (i.e., one of DCIs 1, 1B, 1D, 2, 2A, 0A, and 0B) such that data transmission can be performed using the transmission mode set for each terminal 200 in order to improve throughput. Consequently, the data transmission can be performed using the transmission mode set for each terminal 200, and therefore the throughput can be improved.

However, the error in receiving data may frequently occur in a transmission mode set for each terminal 200 due to a rapid change in the propagation path condition or a change in interference from adjacent cells or the like. In this case, control section 102 generates the allocation control information in the format common to all terminals (i.e., DCI 0/1A) and transmits data using a robust default transmission mode. Consequently, further robust data transmission is possible even when propagation environment is rapidly changed.

In addition, control, section 102 generates allocation control information common to all terminals (i.e., DCI 0/1A) and transmits the information using the default transmission mode, also in transmitting control information on the higher layer (i.e., RRC signaling) for notifying a change of the transmission mode when a propagation path condition is deteriorated. The number of information bits of DCI 0/1A common to all terminals is smaller than the numbers of information bits of DCIs 1, 2, 2A, 0A, and 0B that depend on a transmission mode. For this reason, DCI 0/1A can be used for transmission with a lower coding rate than DCIs 1, 2, 2A, 0A, and 0B, when the same CCE aggregation level is set. Consequently, control section 102 uses DCI 0/1A when the propagation path condition is deteriorated, and as a result, even a terminal, of which the propagation path condition is poor, can receive the allocation control information (and data) with a low error rate.

Control section 102 generates allocation control information for a common channel (e.g., DCIs 1C and 1A) for data allocation common to a plurality of terminals, such as broadcast information and paging information, other than the allocation control information for terminal-specific data allocation.

In the generated allocation control information for terminal-specific data allocation, control section 102 outputs: MCS information and NDI to PDCCH generating section 104; uplink resource allocation information to PDCCH generating section 104 and extracting section 117; and downlink resource allocation information to PDCCH generating section 104 and multiplexing section 109. Control section 102 also outputs the generated allocation control information for a common channel to PDCCH generating section 104.

Search space setting section 103 sets a common search space (C-SS) and UE specific search space (UE-SS) based on a transmission region of DCI indicated by the setting information inputted from setting section 101 and reference signals in use. As described above, the common search space (C-SS) is common to all terminals, and the UE specific search space (UE-SS) is dedicated to each terminal.

Specifically, search space setting section 103 sets previously set CCEs (e.g., sixteen CCEs from the first CCE) as C-SS. The CCE is a standard unit.

In contrast, search space setting section 103 sets UE-SS for each terminal. For example, search space setting section 103 calculates UE-SS of a certain terminal from a CCE aggregation level (L), which forms a search space, and a CCE number calculated from a terminal ID of the terminal and a hash function which performs randomization.

Figure 8:
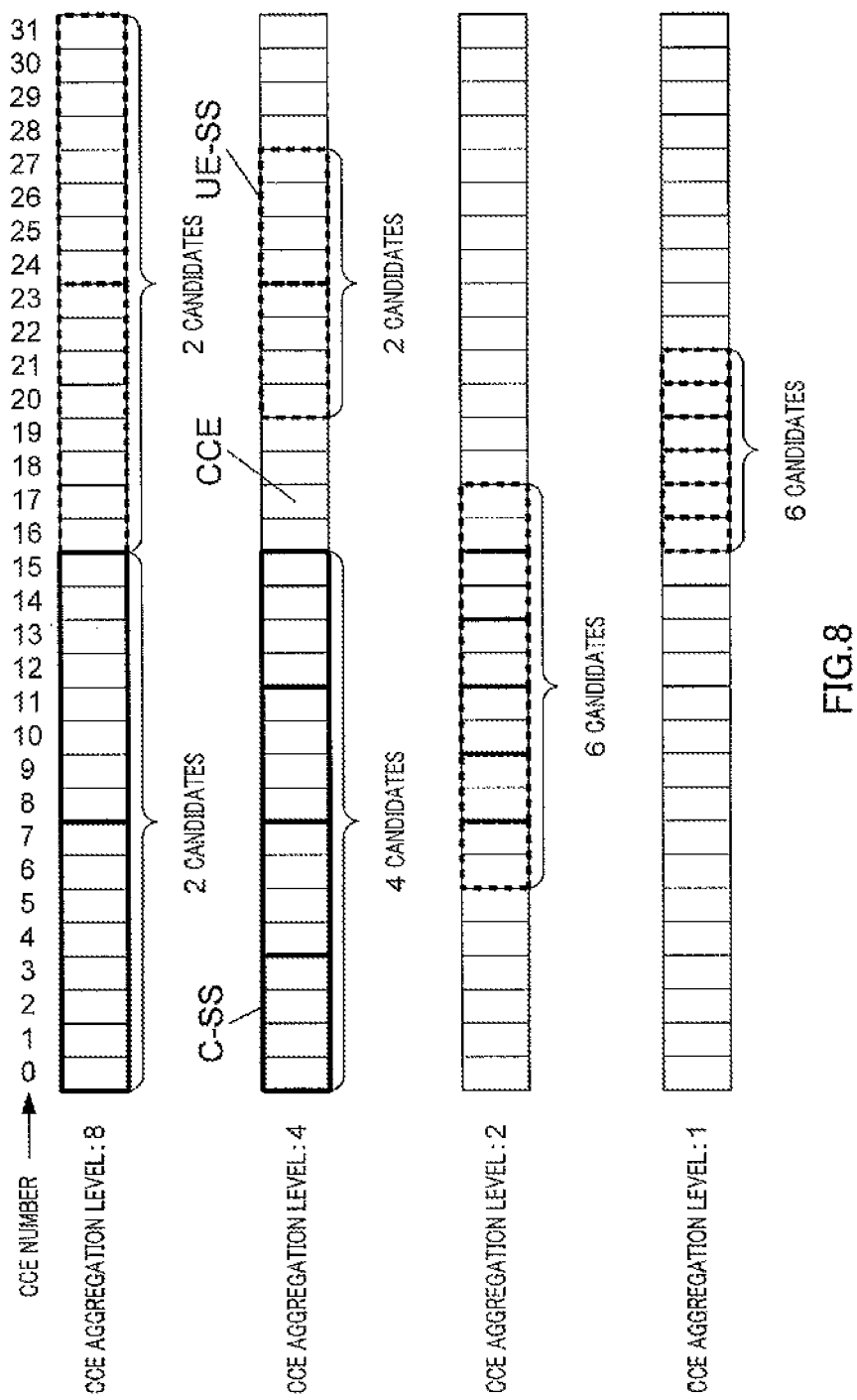
FIG. 8 shows example setting of UE-SS for a certain terminal and C-SS.

FIG. 8 shows example setting of UE-SS for a certain terminal and C-SS.

In FIG. 8, four DCI allocation region candidates (i.e., CCEs 0 to 3, 4 to 7, 8 to 11, and 12 to 15) are set as C-SS in CCE aggregation level 4 of PDCCH. In addition, two DCI allocation region candidates (i.e., CCEs 0 to 7 and 8 to 15) are set as C-SS in CCE aggregation level 8 of PDCCH. In other words, a total of six DCI allocation region candidates are set as C-SS in FIG. 8.

Additionally, six DCI allocation region candidates (i.e., each of CCEs 16 to 21) are set as UB-SS in CCE aggregation level 1 in FIG. 8. Six DCI allocation region candidates (i.e., formed by dividing CCEs 6 to 17 in pairs) are set as UE-SS in CCE aggregation level 2. Two DCI allocation region candidates (i.e., CCEs 20 to 23 and 24 to 27) are set as UE-SS in CCE aggregation level 4. Two DCI allocation region candidates (i.e., CCEs 16 to 23 and 24 to 31) are set as UE-SS in CCE aggregation level 8. In other words, a total of sixteen DCI allocation region candidates are set as UE-SS in FIG. 8.

Alternatively, when both of a PDCCH region and an R-PDCCH region are set as transmission regions of DCI, search space setting section 103 sets the search spaces that include a plurality of DCI allocation region candidates described above (i.e., C-SS and UE-SS) in the PDCCH region and the R-PDCCH region.

Search space setting section 103 outputs the search space information that indicates the set C-SS and the set UE-SS of each terminal, to allocation section 108 and coding/modulating section 106.

Referring back to FIG. 7, PDCCH generating section 104 generates DCI that includes allocation control information for terminal-specific data allocation (i.e., MCS information, HARQ information, uplink resource allocation information, downlink resource allocation information or the like for each terminal), or DCI that includes allocation control information for a common channel (i.e., broadcast information common to terminals and paging information, for example), both pieces of allocation control information being received from control section 102.

PDCCH generating section 104 allows DCI to include "virtual CRC," when R-PDCCH is used for transmitting DCI to terminal 200 (i.e., when allocation section 108 allocates R-CCE to DCI to terminal 200). In this case, one or a plurality of "known bits" are inserted as virtual CRC. The number of known bits may be a previously fixed bit number or the number of bits that is shared between base station 100 and terminal 200 by broadcasting or notifying the bit number from base station 100 to terminal 200.

Furthermore, PDCCH generating section 104 adds CRC bits to DCI that includes "virtual CRC," the uplink allocation control information and downlink allocation control information generated for each terminal 200, and then masks (or scrambles) the CRC bits using a terminal ID. PDCCH generating section 104 outputs DCI on which the CRC bits are masked to coding/modulating section 105.

In other words, PDCCH generating section 104 generates DCI which includes the uplink allocation control information, the downlink allocation control information, and the virtual CRC and to which the CRC bits are added. While the CRC bits are masked (or scrambled) using the terminal ID, the virtual CRC is not masked (or scrambled).

Coding/modulating section 105 performs channel coding and modulation on the DCI received from PDCCH generating section 104, and outputs the modulated signals to allocation section 108. In this case, coding/modulating section 105 sets a coding rate such that each terminal can achieve sufficient reception quality, based on channel quality indicator (CQI) information reported from each terminal. For example, coding/modulating section 105 sets a lower coding rate for a terminal located in the vicinity of a cell boundary (i.e., terminal having lower channel quality).

Allocation section 108 allocates DCI that includes allocation control information for a common channel and DCI that includes allocation control information for terminal-specific data allocation for each terminal, to CCE or R-CCE in C-SS or CCE or R-CCE in UE-SS for each terminal, respectively, the CCE or R-CCE indicated by the search space information received from search space setting section 103, both pieces of DCI being inputted from coding/modulating section 105.

For example, allocation section 108 selects a single DCI allocation region candidate from a DCI allocation region candidate group in C-SS (e.g., FIG. 8). Allocation section 108 allocates DCI, which includes allocation control information for a common channel, to CCE (or R-CCE) (hereinafter, simply referred to as "CCE" without distinguishing between CCE and R-CCE) in the selected DCI allocation region candidate. As described above, the CCE is a resource unit that forms PDCCH, and the R-CCE is a resource unit forming R-PDCCH.

When a DCI format for the terminal targeted for allocation (hereinafter, referred to as "allocation target terminal") depends on a transmission mode (e.g., DCIs 1, 1B, 1D, 2, 2A, 0A, or 0B), allocation section 108 allocates DCI to CCE in UE-SS set for the allocation target terminal. In contrast, when a DCI format for the allocation target terminal is common to all terminals (e.g., DCI 0/1A), allocation section 108 allocates DCI to CCE in UE-SS set for the allocation target terminal or CCE in C-SS.

The CCE aggregation level allocated to a single piece of DCI differs depending on a coding rate and the number of bits of DCI (i.e., information amount of allocation control information). For example, the coding rate of PDCCH signals addressed to a terminal located in the vicinity of a cell boundary is set low, and therefore more physical resources are required. Therefore, allocation section 108 allocates DCI addressed to the terminal located in the vicinity of the cell boundary, to more CCEs.

Allocation section 108 outputs information on CCE allocated to DCI, to multiplexing section 109 and ACK/NACK receiving section 120. Allocation section 108 also outputs coded and modulated DCI to multiplexing section 109.

Coding/modulating section 106 performs channel coding and modulation on the setting information inputted from setting section 101 and the search space information inputted from search space setting section 103 (i.e., control information of higher layer), and outputs the modulated setting information and search space information to multiplexing section 109.

Coding/modulating section 107 performs channel coding and modulation on the inputted transmitted data (i.e., downlink data), and outputs the modulated transmitted data signals to multiplexing section 109.

Multiplexing section 109 multiplexes the coded and modulated DCI signals received from allocation section 108, the modulated setting information and search space information received from coding/modulating section 106 (i.e., control information of higher layer), and the data signals received from coding/modulating section 107 (i.e., PDSCH signals), in the time domain and the frequency domain.

Multiplexing section 109 multiplies a weight by PDSCH signals or DCI in the R-PDCCH region for a terminal that uses DM-RS as reference signals for demodulation, for example, and outputs the result to inverse fast fourier transform (IFFT) section 110 of each antenna. Alternatively, multiplexing section 109 performs a spatial frequency block coding (SFBC) process on signals in which a transmission weight is not set (i.e., DCI in the PDCCH region, for example), and outputs the result to inverse fast fourier transform (IFFT) section 110 of each antenna. Multiplexing section 109 also maps data signals (i.e., PDSCH signals) and PDCCH signals based on the downlink resource allocation information received from control section 102. Multiplexing section 109 may map the setting information and search space information to PDSCH.

IFFT section 110 converts the multiplexed signals of each antenna, which are received from multiplexing section 109, into a time waveform, and CP adding section 111 acquires OFDM signals by adding a CP to this time waveform.

RF transmitting section 112 performs a transmission radio process (i.e., up-conversion and a digital-to-analog (D/A) conversion, for example) on the OFDM signals received from CP adding section 111 and transmits the result through antenna 113.

RF receiving section 114 applies a reception radio process (i.e., down-conversion, analog-to-digital (AD) conversion, or the like) to reception radio signals received in a receiving band through antenna 113, and outputs the resulting received signals to CP removing section 115.

CP removing section 115 removes the CP from the received signals, and fast fourier transform (FFT) section 116 converts the received signals from which the CP is removed into frequency domain signals.

Extracting section 117 extracts uplink data from the frequency domain signals received from FFT section 116 based on the uplink resource allocation information received from control section 102, and IDFT section 118 converts the extracted signals into time domain signals and outputs the time domain signals to data receiving section 119 and ACK/NACK receiving section 120.

Data receiving section 119 decodes the time domain signals inputted from IDFT section 118. Data receiving section 119 then outputs the decoded uplink data as received data.

ACK/NACK receiving section 120 extracts ACK/NACK signals from each terminal to downlink data (i.e., PDSCH signals) among the time region signals received from IDFT section 118. Specifically, ACK/NACK receiving section 120 extracts the ACK/NACK signals from uplink control channel (e.g., physical uplink control channel (PUCCH)), based on the information received from allocation section 108. The uplink control channel is associated with CCE used for transmitting downlink allocation control information corresponding to the downlink data.

ACK/NACK receiving section 120 performs ACK/NACK decision on the extracted ACK/NACK signals.

In this case, CCE is associated with PUCCH in order to eliminate the need for signaling designed for notifying PUCCH from a base station to each terminal, the PUCCH used by each terminal for transmitting the ACK/NACK signals. Accordingly, downlink communication resource can be effectively used. Accordingly to this association, each terminal determines PUCCH used for transmitting ACK/NACK signals, based on the CCE, on which the downlink allocation control information (i.e., DCI) addressed to the terminal is mapped.

[Configuration of Terminal 200]

Figure 9:
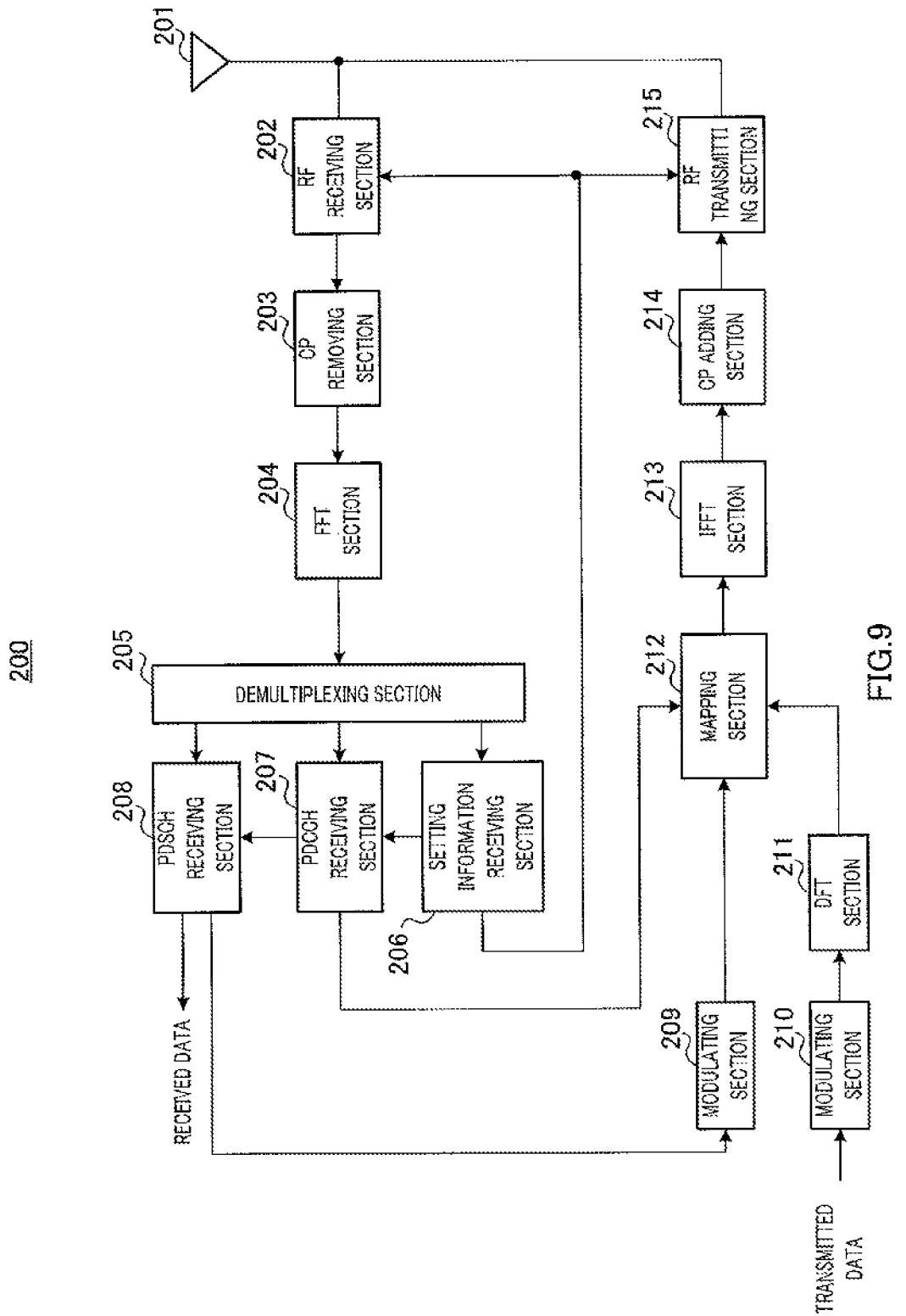
FIG. 9 is a block diagram showing a configuration of the terminal according to Embodiment 1 of the claimed invention.

FIG. 9 is a block diagram showing a configuration of terminal 200 according to Embodiment 1 of the claimed invention. Terminal 200 receives downlink data and transmits ACK/NACK signals associated with the downlink data to base station 100 using PUCCH that is uplink control channel.

In FIG. 9, terminal 200 includes antenna 201, RF receiving section 202, CP removing section 203, FFT section 204, demultiplexing section 205, setting information receiving section 206, PDCCH receiving section 207, PDSCH receiving section 208, modulating sections 209 and 210, DFT section 211, mapping section 212, IFFT section 213, CP adding section 214, and RF transmitting section 215.

RF receiving section 202 sets a receiving band based on the band information received from setting information receiving section 206. RF receiving section 202 applies a reception radio process (i.e., down-conversion, analog-to-digital (A/D) conversion, or the like) to radio signals received in the receiving band through antenna 201 (i.e., OFDM signals in this embodiment), and outputs the resulting received signals to CP removing section 203. The received signals may include PDSCH signals, DCI, and control information in the higher layer including setting information and search space information. DCI (i.e., allocation control information) addressed to terminal 200 is allocated to a common search space (C-SS) set to terminal 200 and another terminal, or a UE specific search space (UE-SS) set to terminal 200.

CP removing section 203 removes a CP from the received signals, and FFT section 204 converts the received signals from which the CP is removed into frequency domain signals. The frequency domain signals are outputted to demultiplexing section 205.

Demultiplexing section 205 outputs a component, which may include DCI, (i.e., signals extracted from a PDCCH region and an R-PDCCH region) among the signals received from FFT section 204, to PDCCH receiving section 207. Demultiplexing section 205 also outputs control signals in the higher layer (e.g., RRC signaling, for example) including the setting information, to setting information receiving section 206 and outputs data signals (i.e., PDSCH signals) to PDSCH receiving section 208.

Setting information receiving section 206 reads band information set to the terminal, information indicating a terminal ID set to the terminal, search space information set to the terminal, information indicating reference signals set to the terminal, and information indicating the transmission mode set to the terminal, from the control signals in the higher layer inputted from demultiplexing section 205.

The band information set to the terminal is outputted to PDCCH receiving section 207, RF receiving section 202, and RE transmitting section 215. The information indicating the terminal ID set to the terminal is outputted to PDCCH receiving section 207 as terminal ID information. The information that indicates a resource region used for transmitting DCI set to the terminal is outputted to PDCCH receiving section 207 as search space region information. The information that indicates reference signals set to the terminal is outputted to PDCCH receiving section 207 as reference signal information. The information that indicates a transmission mode and is set to the terminal is outputted to PDCCH receiving section 207 as transmission mode information.

PDCCH receiving section 207 acquires DCI addressed to the terminal, through blind decoding (i.e., monitoring) on signals inputted from demultiplexing section 205. PDCCH receiving section 207 performs the blind decoding on each of a DCI format for data allocation common to all terminals (e.g., DCI 0/1A), a DCI format depending on a transmission mode set to the terminal (e.g., DCIs 1, 1B, 1D, 2, 2A, 0A and 0B), and a DCI format for a common channel allocation common to all terminals (e.g., DCIs 1C and 1A). Consequently, the DCI that includes allocation control information of each DCI format can be acquired.

Specifically, when the search space region information received from setting information receiving section 206 indicates a PDCCH region, PDCCH receiving section 207 performs the blind decoding on DCI formats for a common channel allocation (i.e., DCI 1C and 1A) and the DCI format for data allocation common to all terminals (DCI 0/1A) in C-SS indicated in the search space region information. In other words, PDCCH receiving section 207 demodulates and decodes each blind decoding region candidate in C-SS (i.e., candidate in a CCE region allocated to terminal 200) with respect to the size of the DCI format for a common channel allocation and the size of the DCI format for data allocation common to all terminals. PDCCH receiving section 207 demasks CRC bits of the decoded signals by an ID common to a plurality of terminals. PDCCH receiving section 207 determines that signals, which represent CRC=OK (i.e., no error) as the result of demasking, are the DCI including allocation control information for a common channel. Alternatively, PDCCH receiving section 207 demasks the CRC bits by the terminal ID of the terminal indicated by terminal ID information, with respect to the decoded signals. PDCCH receiving section 207 determines that signals, which represent CRC=OK (i.e., no error) as the result of demasking, are the DCI including allocation control information for the terminal. In other words, in C-SS, PDCCH receiving section 207 distinguishes whether the allocation control information of DCI 0/1A is for the common channel or for data allocation addressed to the terminal, by a terminal ID (i.e., ID common to a plurality of terminals, or terminal ID of terminal 200).

In addition, PDCCH receiving section 207 calculates each UE-SS of the terminal for each CCE aggregation level, using the terminal ID of the terminal indicated by the terminal ID information inputted from setting information receiving section 206. PDCCH receiving section 207 demodulates and decodes each blind decoding region candidate in the calculated UE-SS (i.e., CCE candidates of each CCE aggregation level) with respect to the size of the DCI format associated with a transmission mode set to the terminal (i.e., transmission mode indicated in the transmission mode information) and the size of the DCI format common to all terminals (i.e., DCI 0/1A). PDCCH receiving section 207 demasks CRC bits by a terminal ID of the terminal, with respect to the decoded signals. PDCCH receiving section 207 determines that signals, which represent CRC=OK (i.e., no error) as the result of demasking, are the DCI addressed to the terminal.

Meanwhile, also when an R-PDCCH region is also included as a search space region indicated in the search space region information inputted from setting information receiving section 206, PDCCH receiving section 207 also performs the blind decoding (i.e. monitoring) on search spaces set in the PDCCH region and the R-PDCCH region and acquires the DCI that is addressed to the terminal and is transmitted through PDCCH and R-PDCCH, as with above described PDCCH region.

When DCI is transmitted through R-PDCCH (i.e., when DCI representing CRC=OK exists in the R-PDCCH region), PDCCH receiving section 207 checks whether or not the portion of bit pattern in the DCI that corresponds to virtual CRC is the same as the bit pattern of a known bit sequence (i.e., criterion bit sequence). When the bit patterns are not the same, PDCCH receiving section 207 determines that false detection of the DCI occurs and thus ignores even the DCI representing CRC=OK. Alternatively, when any search space region information is not inputted from setting information receiving section 206 (i.e., base station 100 dose not transmit the search space information), terminal 200 may perform blind decoding in transmission regions of a plurality of pieces of DCI that may be addressed to terminal 200, without regard to a search space.

PDCCH receiving section 207 outputs: downlink resource allocation information included in the DCI addressed to the terminal to PDSCH receiving section 208 when receiving downlink allocation control information; and uplink resource allocation information to mapping section 212 when receiving uplink allocation control information. PDCCH receiving section 207 outputs a CCE number of CCE (i.e., CCE number of the first CCE when the number of connected CCEs is more than one) used for transmitting DCI addressed to the terminal (i.e., CCE used for transmitting signals representing CRC=OK) to mapping section 212.

PDSCH receiving section 208 extracts received data (i.e., downlink data) from the PDSCH signals received from demultiplexing section 205, based on the downlink resource allocation information received from PDCCH receiving section 207. In other words, PDSCH receiving section 208 receives downlink data (i.e., downlink data signals) based on the downlink resource allocation information (i.e., allocation control information) that is addressed to terminal 200 and is allocated to one of a plurality of DCI allocation region candidates (i.e., blind decoding region candidates). PDSCH receiving section 208 performs error detection on the extracted received data (i.e., downlink data). As the result of the error detection, PDSCH receiving section 208 generates NACK signals as ACK/NACK signals when an error is found in the received data, and generates ACK signals as ACK/NACK signals when no error is found in the received data. The ACK/NACK signals are outputted to modulating section 209.

Modulating section 209 modulates the ACK/NACK signals inputted from PDSCH receiving section 208 and outputs the modulated ACK/NACK signals to mapping section 212.

Modulating section 210 modulates transmitted data (i.e., uplink data) and outputs the modulated data signals to DFT section 211.

DFT section 211 converts the data signals inputted from modulating section 210 into frequency domain signals and outputs the resulting plurality of frequency components to mapping section 212.

Mapping section 212 maps, on PUSCH, the plurality of frequency components received from DFT section 211, in accordance with the uplink resource allocation information received from PDCCH receiving section 207. Mapping section 212 specifies PUCCH in accordance with the CCE number received from PDCCH receiving section 207. Mapping section 212 maps the ACK/NACK signals inputted from modulating section 209 on the specified PUCCH described above.

IFFT section 213 converts a plurality of frequency components mapped on the PUSCH into a time-domain waveform, and CP adding section 214 adds a CP to the time-domain waveform.

RF transmitting section 215 is formed to be able to change a transmission band. RF transmitting section 215 sets the transmission band based on the band information received from setting information receiving section 206. Then, RF transmitting section 215 applies a transmission radio process (i.e., up-conversion, digital-to-analog (D/A) conversion, or the like) to signals to which a CP is added, and transmits the result through antenna 201.

[Operations of Base Station 100 and Terminal 200]

Figure 10:
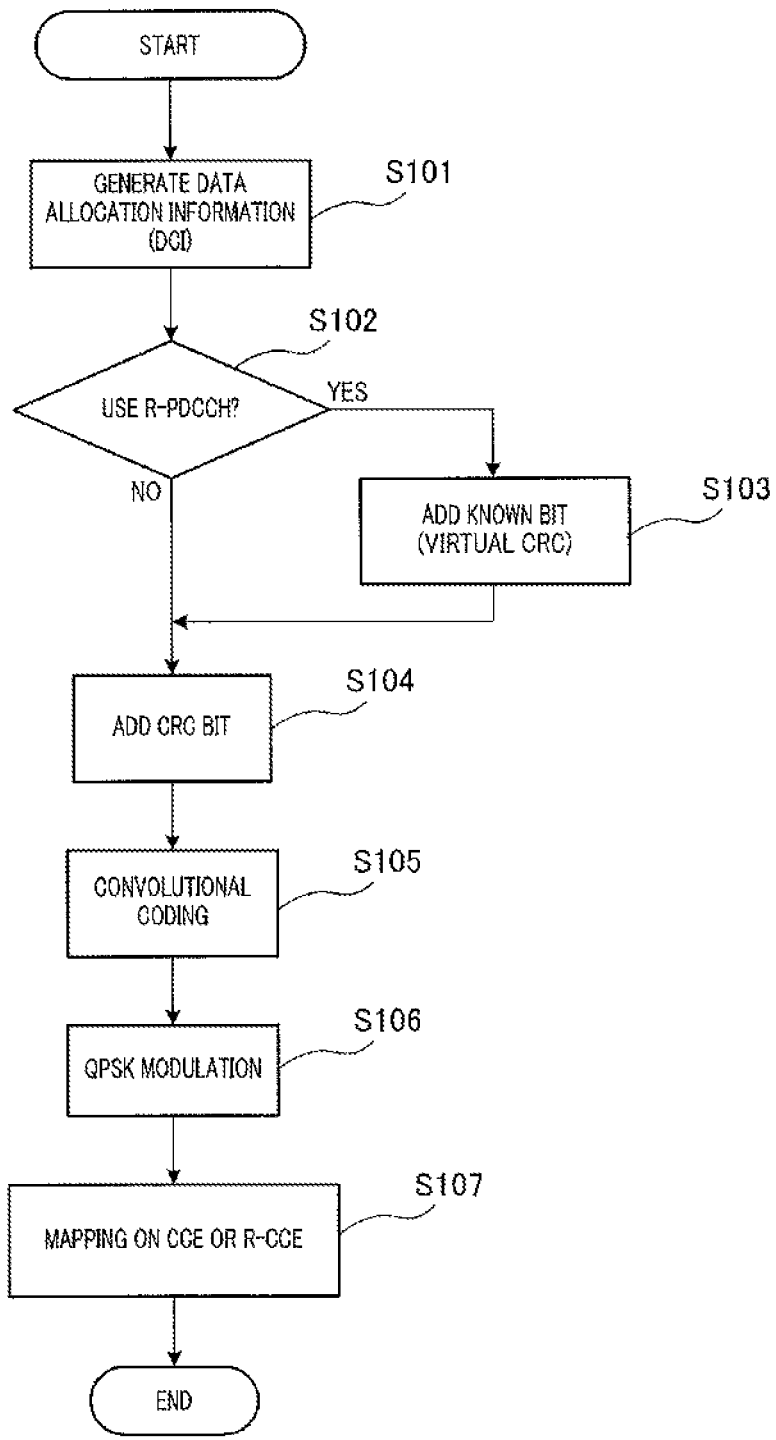
FIG. 10 is a flowchart to explain the operation of a base station.

The operations of base station 100 and terminal 200 having the above mentioned configurations will be described. FIG. 10 is a flowchart to explain the operation of base station 100.

In step S101, PDCCH generating section 104 generates DCI.

In step S102, PDCCH generating section 104 determines whether or not to use R-PDCCH for transmitting the DCI, based on the setting information received from setting section 101.

When using R-PDCCH (step S102: YES), PDCCH generating section 104 adds "virtual CRC" to the generated DCI in step S103. In this case, "known bit" is newly added. Terminal 200 also holds and uses this "known bit" to determine whether or not the DCI is addressed to terminal 200, as described hereinafter.

In step S104, PDCCH generating section 104 calculates CRC bits from the entire bit sequence of DCI to which "virtual CRC" is added in step S103, and adds the CRC bits to the DCI. Alternatively, when determining, in step S102, not to use the R-PDCCH (i.e., when determining to use PDCCH), PDCCH generating section 104 calculates CRC bits from the entire bit sequence of the DCI which is generated in step S101 and to which "virtual CRC" is not added, and adds the CRC bits to the DCI.

In step S105, coding/modulating section 105 convolutionally encodes the DCI received from PDCCH generating section 104.

In step S106, coding/modulating section 105 modulates (e.g., QPSK modulation) a codeword acquired in step S105.

In step S107, allocation section 108 and multiplexing section 109 map the DCI received from coding/modulating section 105 on CCE or R-CCE. In other words, when R-PDCCH is determined, in step S102, to be used, the DCI is mapped on R-CCE. On the other hand, when the R-PDCCH is determined not to be used, the DCI is mapped on CCE.

Figure 11:
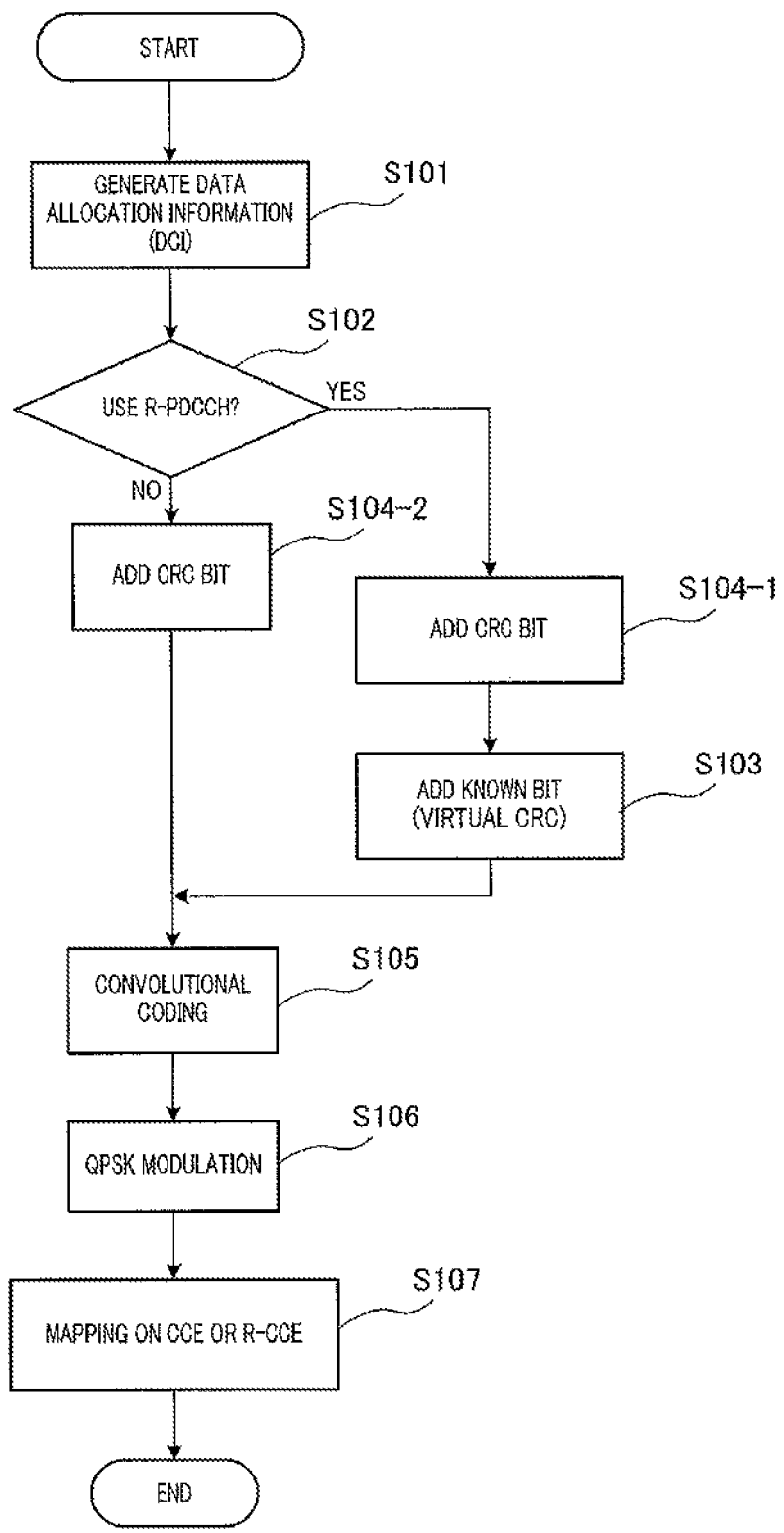
FIG. 11 is another flowchart to explain the operation of the base station.

In this case, when "virtual CRC" and CRC bits are added to DCI, "virtual CRC" is added at first and then the CRC bits are added. However, the claimed invention is not limited to this, and the CRC bits may be added at first and then "virtual CRC" may be added. In other words, a process may be performed by the flow shown in FIG. 11. Consequently, the number of bits forming a bit sequence targeted for a CRC check in terminal 200 is reduced and thus the probability of false detection is decreased. Meanwhile, when the CRC bits are added, after the addition of "virtual CRC," a series of processes of terminal 200, which includes PDCCH (R-PDCCH) reception, convolutional decoding, and the CRC check, is the same as that of LTE, and thus the configuration of terminal 200 can be simplified.

In this way, the DCI mapped on R-CCE (or CCE) is transmitted to terminal 200.

In terminal 200, PDCCH receiving section 207 performs blind decoding (i.e., monitoring) on search spaces set in a PDCCH region and an R-PDCCH region, and then acquires DCI that is addressed to terminal 200 and is transmitted through PDCCH and R-PDCCH, as with the PDCCH region, also when a search space region includes the PDCCH region and the R-PDCCH region, the search space region being indicated by the search space region information inputted from setting information receiving section 206.

When DCI is transmitted through R-PDCCH (i.e., when the DCI representing CRC=OK in the R-PDCCH region exists), PDCCH receiving section 207 checks whether or not a bit pattern of a part corresponding to virtual CRC in the DCI is the same as a bit pattern of a known bit sequence (i.e., criterion bit sequence). When they are not the same, PDCCH receiving section 207 determines that false detection of the DCI occurs and ignores even the DCI representing CRC=OK.

Even when the result of DCI decoding is correct, the DCI addressed to another terminal may be wrongly detected as the DCI addressed to terminal 200, due to false detection. Such false detection may occur only when only the part corresponding to the CRC bits masked by a terminal ID in base station 100 is received as a different content from that at transmission. In other words, a case is equivalent to a case where only a part of the CRC bits (i.e., bit part that is included in the wrongly detected DCI and is different from the terminal ID of the allocation target terminal) is wrong.

In addition, even though the result of DCI decoding is correct, the DCI addressed to another terminal may be wrongly detected as the DCI addressed to the terminal, due to false detection. Such false detection occurs when contiguous bits having the same length as that of CRC bits are wrongly detected as the CRC bits addressed to the terminal. Consequently, this type of false detection does not occur unless two terminal IDs, in which all constituent bits are mutually different, are allocated to two respective terminals.

Meanwhile, false detection occurs with a probability of causing sequential errors in a random bit sequence for a CRC length, when a random error occurs in the result of DCI decoding (i.e., when blind decoding is performed on resources on which any DCI addressed to the terminal and/or other terminals are not actually mapped). In other words, the false detection occurs at the probability represented by equation 1.

(Equation 1)

$$P = 1 - \left(1 - \left(\frac{1}{2^K}\right)\right)^M \quad [1]$$

where K represents a CRC length, and M represents the number of blind decoding attempts.

An R-PDCCH region can be used for data transmission. Accordingly, only the PDCCH region is often used instead of the R-PDCCH region when the number of control channels that are transmission targets is small. In other words, the PDCCH region is used to transmit DCI that includes the DCI addressed to the terminal and the DCI addressed to another terminal, in practice.

Consequently, the PDCCH region has a high probability that the result of DCI convolutional decoding is correct, which makes the probability of false detection low as described above.

In contrast, the R-PDCCH region is used to transmit data signals in some cases instead of DCI, and therefore has the high probability that the result of DCI convolutional, decoding is false, which makes the probability of false detection high as a result.

In the PDCCH region, the result of convolutional decoding is false when the DCI format different from the DCI format targeted for blind decoding is mapped. However, the same DCI format is often used for terminals having similar communication environment in the same cell, and therefore the possibility that the false detection occurs in the PDCCH region is low even when such a case is took into consideration.

Figure 12:
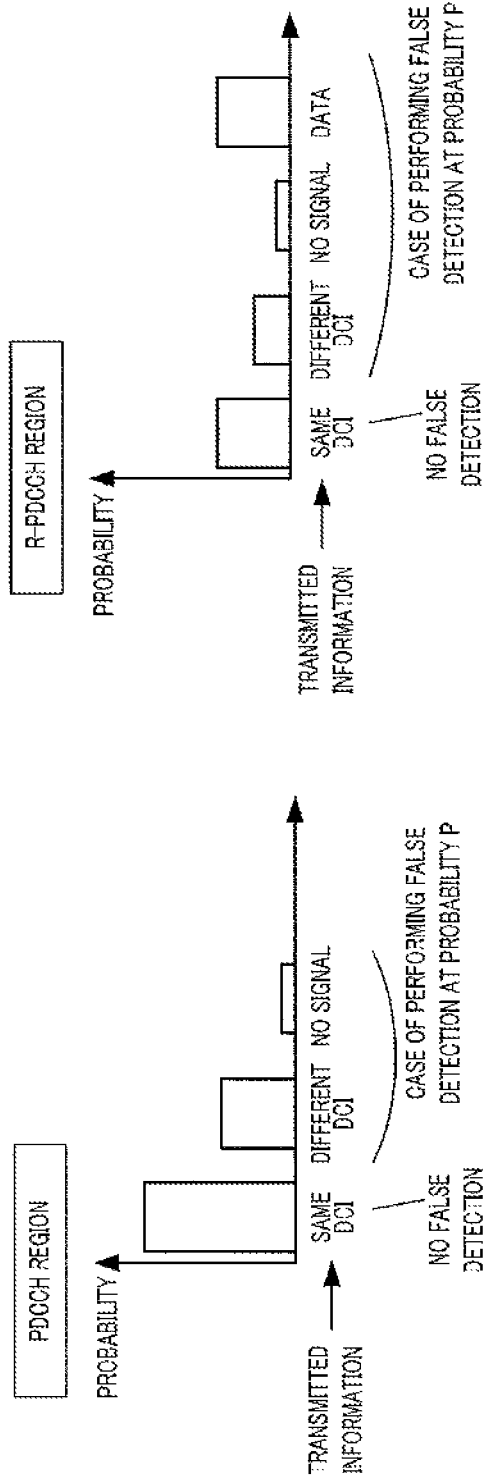
FIG. 12 shows a probability distribution of information transmitted in each of a PDCCH region and an R-PDCCH region.

FIG. 12 shows a probability distribution of information transmitted in each of a PDCCH region and an R-PDCCH region. As shown in FIG. 12A, the PDCCH region involves three cases: the same DCI format is transmitted; different DCI formats are transmitted; and no signal is transmitted. Compared to this, as shown in FIG. 12B, the R-PDCCH region involves another case in which data is transmitted, in addition to the above three cases. The probability of occurrences of false detection in the PDCCH region or the R-PDCCH region is determined by calculating the sum of the results of multiplying the probabilities of occurrences of all the cases and the probabilities of occurrences of the false detection in these cases. Thus, as shown in FIG. 12, the probability, in which the false detection occurs, in the R-PDCCH region is higher than that in the PDCCH region.

According to the present embodiment described above, in base station 100, PDCCH generating section 104 generates a downlink allocation control information unit (i.e., DCI), which includes both of cyclic redundancy check (CRC) bits masked or scrambled by the identification information of terminal 200, and a bit sequence (i.e., virtual CRC) mutually known between base station 100 and terminal 200, and allocation section 108 and multiplexing section 109 maps the generated DCI on a resource region (i.e., R-PDCCH region) available to both of a downlink control channel region and a downlink data channel region. In other words, PDCCH generating section 104 includes the virtual CRC in the DCI only when mapping DCI addressed to terminal 200 on the R-PDCCH region.

Consequently, terminal 200 can determine whether or not the DCI is addressed to terminal 200, based on the Virtual CRC in addition to the check result of CRC bits demasked or descrambled with a terminal ID of terminal 200, and thus the false detection of control information can be decreased. As a result, reduction of the system throughput can be prevented.

In terminal 200, demultiplexing section 205 receives a downlink allocation control information unit (i.e., DCI) that includes both of cyclic redundancy check (CRC) bits masked or scrambled by identification information of the destination terminal and a predetermined bit sequence, in a resource region (i.e., R-PDCCH region) available to both of a downlink control channel region and a downlink data channel region, and PDCCH receiving section 207 determines that the received DCI is addressed to terminal 200 only when the predetermined bit sequence (i.e., virtual CRC) is the same as a criterion bit sequence held by terminal 200.

By this means, even when the check result of the CRC bits demasked or descrambled with the terminal ID of terminal 200 is correct, the received DCI can be ignored when the predetermined bit sequence included in the received DCI is not the same as the criterion bit sequence. In other words, terminal 200 can use the virtual CRC in addition to the check result of the CRC bits as the criterion for determining whether or not the received DCI is addressed to terminal 200. As a result, the false detection of the control information can be decreased, and therefore the reduction of the system throughput can be prevented. The performance of error detection in R-PDCCH with higher probability of occurrence of the false detection than PDCCH can be improved, and therefore the probability of occurrence of the false alarm in the whole system can be effectively decreased.

The present embodiment premises that a known bit sequence (i.e., virtual CRC), which is not included in DCI transmitted in the PDCCH region, is added for DCI transmitted in the R-PDCCH region, and thus a coding rate of the DCI is increased. However, since RBs are used in the R-PDCCH region, DCI transmitted in the R-PDCCH region, can undergo an interference control for minimizing interference among adjacent cells or beam forming transmission. Accordingly, the DCI transmitted in the R-PDCCH region is received with high reception quality (i.e., signal-to-interference power ratio), and thus the amount of deteriorating the error rate of DCI can be minimized.

The number of configuration bits forming the known bit sequence (i.e., virtual CRC) may be a predetermined fixed number or a number that base station 100 notifies (or broadcasts) to terminal 200 in advance. In the latter case, when the number of configuration bits is appropriately selected, a necessary and sufficient false detection rate of DCI can be set depending on a cell environment (i.e., environment having a large number of terminals, or environment having small number of terminals, for example) or an operation form.

Embodiment 2

In Embodiment 2, a part of an RB allocation bit sequence for notifying, to a terminal, at least one of resource blocks (RBs) allocated as a downlink data channel region is used as a known bit sequence (i.e., virtual. CRC). The basic configurations of a base station and a terminal according to Embodiment 2 are common to those of Embodiment 1, and will therefore be described with reference to FIGS. 7 and 9.

In base station 100 of Embodiment 2, transmission region setting section 131 sets a candidate RB group (i.e., resource block region) that includes candidates to be allocated as a downlink data channel region for terminal 200.

Figure 13:
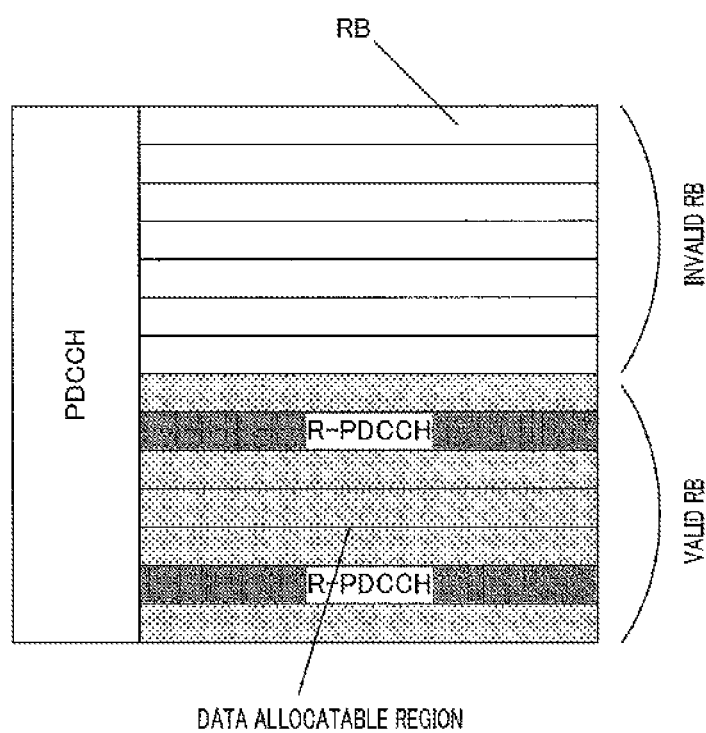
FIG. 13 explains a downlink data channel region allocated by a base station according to Embodiment 2 of the claimed invention.

Specifically, as shown in FIG. 13, while setting a part of the whole RB group as a candidate RB group for terminal 200 (i.e., valid RBs in FIG. 13), transmission region setting section 131 sets the other RBs as RBs on which. DCI for terminal 200 is not mapped (i.e., invalid RBs in FIG. 13).

The information on valid RBs for terminal 200 as set above is included in setting information and is transmitted to terminal 200.

Control section 102 selects a usable RB, which is actually used as a downlink data channel region for terminal 200 to which DCI is transmitted in the R-PDCCH region, from the candidate RB group. Information on this selected usable RB is included in allocation control information as resource allocation information. Fixing candidate RBs for terminal 200 to a part of whole RB group fixes a part of an RB allocation bit sequence or limits a possible bit combination. In the present embodiment, this fixed bit sequence or the limited bit combination is used as virtual CRC.

PDCCH generating section 104 generates DCI including "virtual CRC," when R-PDCCH is used for transmitting DCI addressed to terminal 200 (i.e., when allocation section 108 allocates R-CCE to DCI addressed to terminal 200).

In terminal 200 of Embodiment 2, setting information receiving section 206 reads information on valid RB included in the setting information transmitted from base station 100, and outputs the result to PDCCH receiving section 207. A part of a bit sequence indicating this information on the valid RB is used, as a criterion bit sequence.

When DCI is transmitted through R-PDCCH (i.e., when DCI representing CRC=OK exists in the R-PDCCH region), PDCCH receiving section 207 checks whether or not the bit pattern in the DCI and of the part associated with virtual CRC is the same as the bit pattern of a known bit sequence (i.e., criterion bit sequence). When they are not the same, PDCCH receiving section 207 determines that the false detection of the DCI occurs and thus ignores even the DCI representing CRC=OK. In other words, PDCCH receiving section 207 determines that the DCI is valid when RB indicated by RB allocation information belongs to the valid RB, and outputs the result to PDSCH receiving section 208, the DCI detected through the blind decoding performed in the R-PDCCH region. In contrast, PDCCH receiving section 207 determines that the DCI is invalid and ignores the DCI when the RB indicated by the RB allocation information does not belong to the valid RB.

According to the present embodiment described above, in base station 100, PDCCH generating section 104 generates a downlink allocation control information unit (i.e., DCI) including both of cyclic redundancy check (CRC) bits masked or scrambled by identification information of terminal 200 and a bit sequence (i.e., virtual CRC) mutually known between base station 100 and terminal 200, and allocation section 108 and multiplexing section 109 map the generated DCI to a resource region (i.e., R-PDCCH region) available to both of a downlink control channel region and a downlink data channel region.

A part of an RB allocation bit sequence for notifying resource block (RB) allocated as a downlink data channel region, to terminal 200 is used as the known bit sequence (i.e., virtual CRC).

Consequently, the same effect as Embodiment 1 can be acquired. In addition, a part of the RB allocation bit sequence also included in DCI transmitted in the PDCCH region (i.e., part of existing RB allocation field in DCI) can be used as virtual CRC, and thus the number of bits in the DCI is not increased.

In terminal 200, demultiplexing section 205 receives a downlink allocation control information unit (i.e., DCI) that includes both of cyclic redundancy check (CRC) bits masked or scrambled by the identification information of the destination terminal, and a predetermined bit sequence, in a resource region (i.e., R-PDCCH region) available to both of a downlink control channel region and a downlink data channel region, and PDCCH receiving section 207 determines that the received DCI is addressed to terminal 200 only when the predetermined bit sequence (i.e., virtual CRC) is the same as the criterion bit sequence held by terminal 200.

A part of an RB allocation bit sequence for notifying resource block (RB) allocated as a downlink data channel region, to terminal 200 is used as the criterion bit sequence.

Base station 100 sets a less interfered RB as a valid RB and allocates a terminal in the vicinity of a cell boundary to the valid RB, and as a result, can minimize the reduction of practical flexibility of freedom of RB allocation and decrease the probability of occurrence of false detection. In other words, in a heterogeneous network, using R-PDCCH for transmitting DCI is useful for controlling the interference between a macro base station and a femto/pico base station. This interference control is performed by the macro base station and the femto/pico base station reducing transmission power of specific RBs which are mutually different. However, since R-PDCCH is allocated to one of the RBs, the number of RBs available for transmitting data decreases with an increase in RBs used as an R-PDCCH. In this case, a PDCCH resource can be effectively used by using PDCCH for terminals in the cell center with low inter-cell interference and using R-PDCCH for terminals in the vicinity of a cell boundary with high inter-cell interference. Under such an operation, throughput can be improved by transmitting also data (i.e., PDSCH) through RBs with low interference, to a terminal which is in the vicinity of the cell boundary and for which R-PDCCH needs to be used.

Meanwhile, a valid RB may be the same as an RB targeted for blind decoding in terminal 200 of when DCI is transmitted in the R-PDCCH region. In this case, setting section 101 of base station 100 only needs to notify the RB targeted for blind decoding in terminal 200 of when the DCI is transmitted in the R-PDCCH region, and therefore the amount of control information can be decreased. In a heterogeneous network, an RB with low interference is allocated as the R-PDCCH region when the DCI is transmitted in the R-PDCCH region. Thus, even if the data allocation is limited to the RB, flexibility of data allocation is not deteriorated.

Alternatively, a valid RB may be the same as an RB region not targeted for quality measurement of the other cells by terminal 200 (measurement of reception quality in signals of the other cells for handover, for example). In this case, setting section 101 of base station 100 only needs to notify an RB region targeted for (or not targeted for) the quality measurement of the other cells, and therefore the amount of control information can be decreased. The handover requires the quality measurement of only RB regions at which transmission is performed without lowering transmission power in the other cells. Therefore, it is impossible to select correct cell for the handover depending on the result of quality measurement at the RB regions at which transmission is performed while transmission power is lowered. Consequently, flexibility of data allocation is not deteriorated even when a valid RB (i.e., less interfered RB region) is the same as the RB regions at which transmission is performed in the other cells while transmission power is lowered (i.e., RB region not targeted for quality measurement).

Embodiment 3

In Embodiment 3, a part of a notifying bit sequence for notifying a modulation and coding scheme is used as a known bit sequence (i.e., virtual CRC). The basic configurations of a base station and terminal according to Embodiment 3 are common to Embodiment 1, and will therefore be described with reference to FIGS. 7 and 9.

Setting section 101 sets candidates of a modulation and coding scheme (MCS) applied to downlink data for terminal 200 (hereinafter, referred to as "candidate MCS group") (i.e., valid MCS).

Specifically, only twenty-nine candidates are prepared as an MCS group in LTE. Setting section 101 sets a part of the MCS group as the candidate MCS group for terminal 200 (i.e., valid MCS), and the rest of the MCS group as an MCS group not applied to downlink data transmitted to terminal 200 (i.e., invalid MCS). For example, setting section 101 sets only MCS in which the order of a modulation scheme does not exceed the order of QPSK, as the valid MCS. A threshold representing the boundary of this valid MCS and invalid MCS may be predetermined.

Information on the valid MCS for terminal 200 set as above is included in the setting information and transmitted to terminal 200.

Control section 102 selects a usable MCS from the candidate MCS group, the usable MCS actually used for downlink data for terminal 200 to which DCI is transmitted through the R-PDCCH region. The information on this selected usable MCS is included in allocation control information as MCS information. In this case, fixing the candidate MCS group for terminal 200 to a part of the whole MCS group fixes a part of an MCS notifying bit sequence. In the present embodiment, this fixed bit sequence is used as virtual CRC.

PDCCH generating section 104 generates DCI including "virtual CRC," when R-PDCCH is used for transmitting DCI addressed to terminal 200 (i.e., when allocation section 108 allocates R-CCE to DCI addressed to terminal 200).

In terminal 200 of Embodiment 3, setting information receiving section 206 reads the information on the valid MCS included in the setting information transmitted from base station 100, and outputs the result to PDCCH receiving section 207. A part of a bit sequence indicating the information on this valid MCS is used as the criterion bit sequence.

When DCI is transmitted through R-PDCCH (i.e., when DCI representing CRC=OK exists in the R-PDCCH region), PDCCH receiving section 207 checks whether or not the bit pattern in the DCI and of the part associated with virtual CRC is the same as the bit pattern of a known bit sequence (i.e., criterion bit sequence). When they are not the same, PDCCH receiving section 207 determines that the false detection of the DCI occurs and thus ignores even the DCI representing CRC=OK. In other words, when MCS indicated by MCS information belongs to the valid MCS, PDCCH receiving section 207 determines that the DCI, which is detected by blind decoding in the R-PDCCH region, is valid and outputs the result to PDSCH receiving section 208. Alternatively, when the MCS indicated by the MCS information does not belong to the valid MCS, PDCCH receiving section 207 determines that the DCI is invalid and ignores the DCI.

According to the present embodiment described above, in base station 100, PDCCH generating section 104 generates a downlink allocation control information unit (i.e., DCI) that includes both of cyclic redundancy check (CRC) bits masked or scrambled by identification information of terminal 200 and a bit sequence (i.e., virtual CRC) mutually known between base station 100 and terminal 200, and allocation section 108 and multiplexing section 109 map the generated DCI on a resource region (i.e., R-PDCCH region) available to both of a downlink control channel region and a downlink data channel region.

A part of an MCS notifying bit sequence for notifying a modulation and coding scheme is used as a known bit sequence (i.e., virtual CRC) for terminal 200.

Consequently, the same effect as Embodiment 1 can be acquired. In addition, a part of the MCS notifying bit sequence also included in DCI transmitted in the PDCCH region (i.e., part of existing MCS field in the DCI) can be used as virtual CRC, and thus the number of bits in the DCI is not increased.

In terminal 200, demultiplexing section 205 receives a downlink allocation control information unit (i.e., DCI) that includes both of cyclic redundancy check (CRC) bits masked or scrambled by identification information of the destination terminal, and a predetermined bit sequence, in a resource region (i.e., R-PDCCH region) available to both of a downlink control channel region and a downlink data channel region, and PDCCH receiving section 207 determines that the received DCI is addressed to terminal 200 only when the predetermined bit sequence (i.e., virtual CRC) is the same as a criterion bit sequence held by terminal 200.

A part of the MCS notifying bit sequence for notifying the modulation and coding scheme for terminal 200 is used as the criterion bit sequence.

As described above, in the heterogeneous network, a terminal using R-PDCCH is often located in the vicinity of a cell boundary and requires interference control for the R-PDCCH. Although the interference control improves the reception quality of data, the terminal in the vicinity of the cell boundary rarely uses high MCS level (i.e., 16QAM and 64QAM, for example) as in a terminal in the cell center. In other words, throughput is not deteriorated due to the limitation of a valid MCS as in the present embodiment since the limitation only results in being unable to use an MCS level that is not frequently used.

Embodiment 4

In Embodiment 4, DCI transmitted through R-PDCCH has the same size in the same cell.

Figure 14:
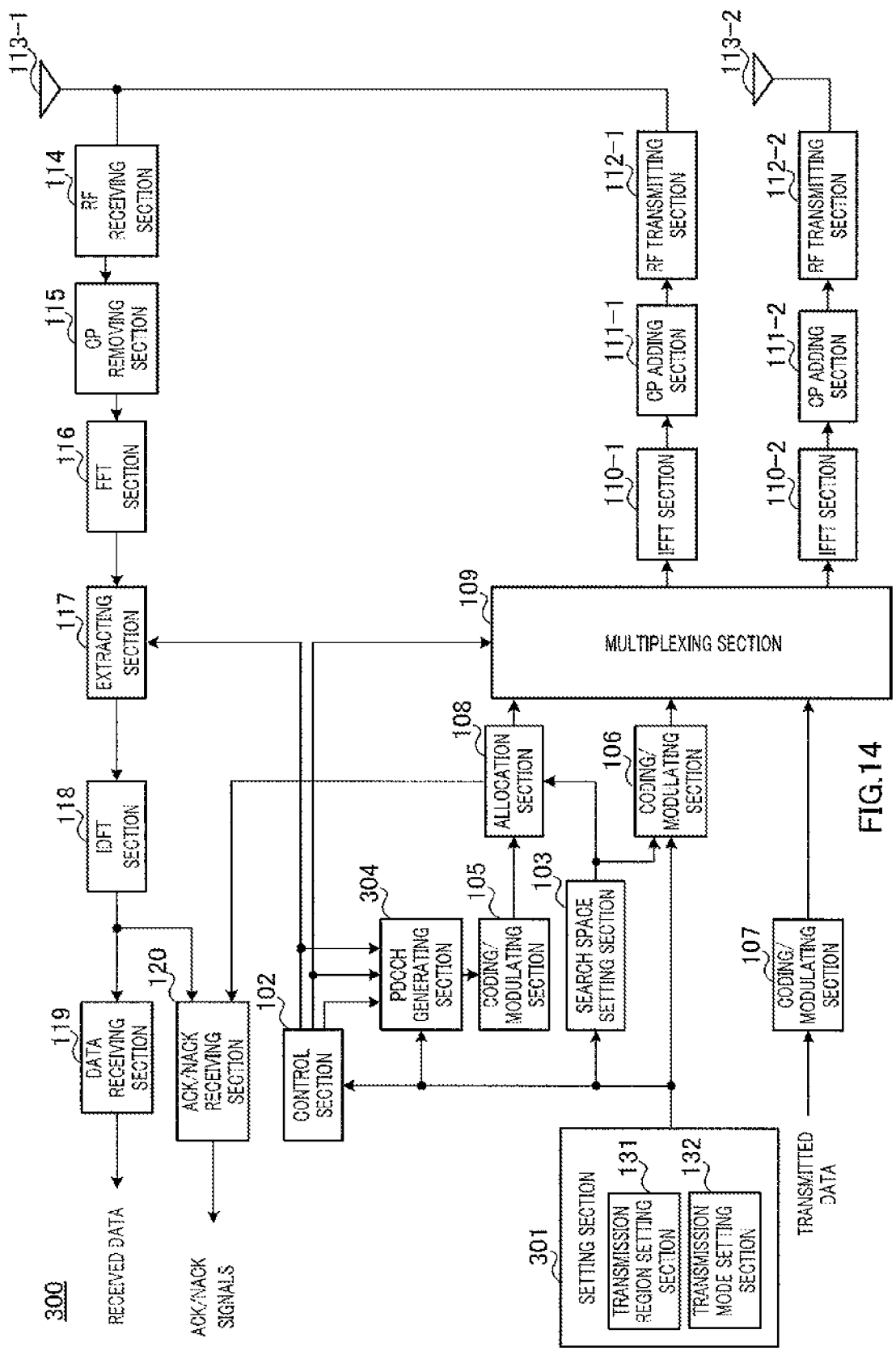
FIG. 14 is a block diagram showing a configuration of a base station according to Embodiment 4 of the claimed invention.

FIG. 14 is a block diagram showing a configuration of base station 300 according to Embodiment 4 of the claimed invention. In FIG. 14, base station 300 includes setting section 301 and PDCCH generating section 304.

Setting section 301 sets the size of DCI (i.e., the number of configuration bits) of when the DCI is transmitted in an R-PDCCH region (hereinafter, referred to as "set DCI size"). Information on the set DCI size is included in setting information and is transmitted to terminal 200. The same DCI size is set for all terminals existing in the same cell. The DCI size is also set larger than the size of a DCI format set in each terminal 400. The setting information may be notified to each terminal (i.e., by RRC signaling), or broadcasted by BCH.

PDCCH generating section 304 adds padding bits to DCI transmitted in the R-PDCCH region until the size of the DCI has the above set DCI size. As the padding bits, all bits may be zero or the other known bits may be possible.

Figure 15:
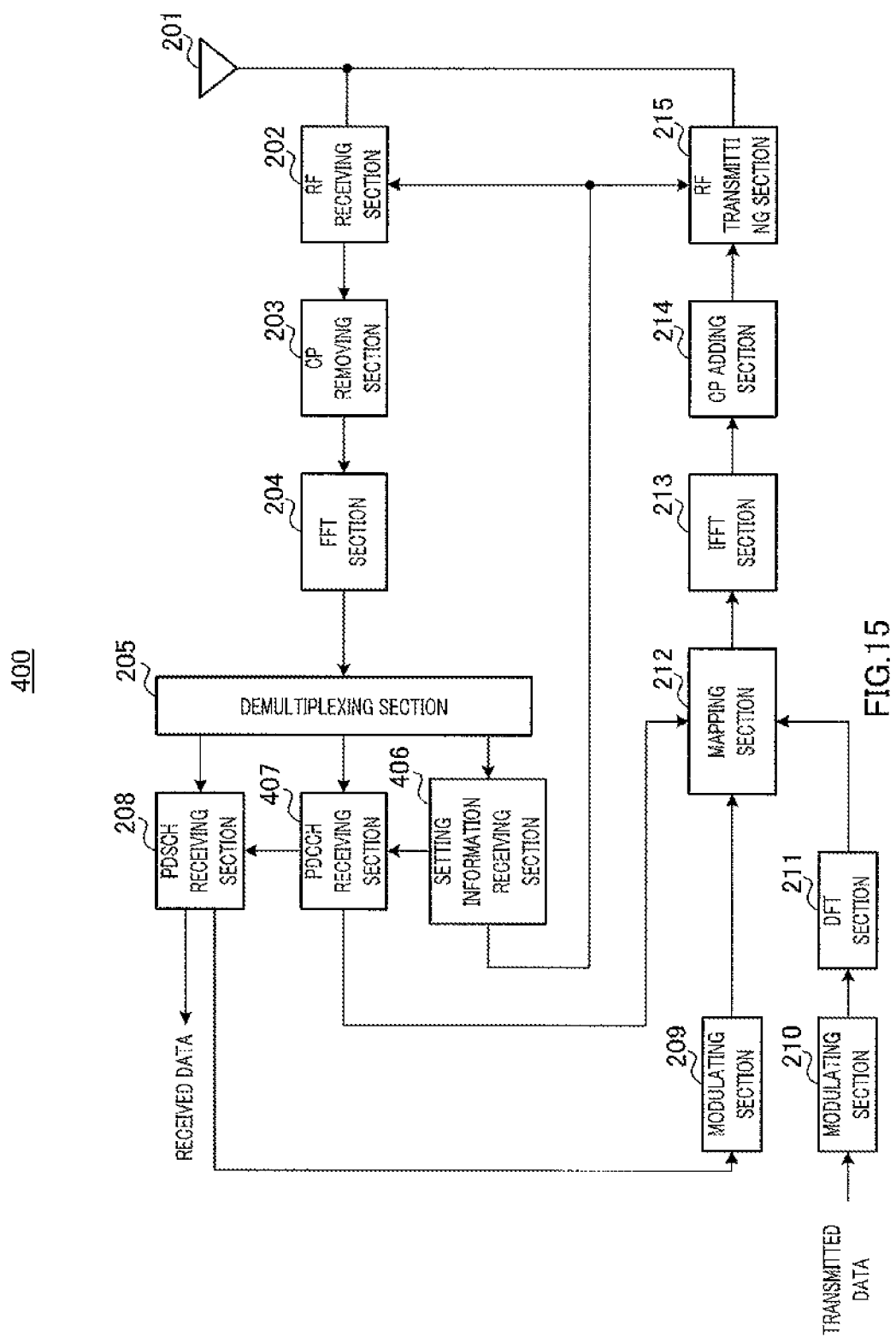
FIG. 15 is a block diagram showing a configuration of a terminal according to Embodiment 4 of the claimed invention.

FIG. 15 is a block diagram showing a configuration of terminal 400 according to Embodiment 4 of the claimed invention. In FIG. 15, terminal 400 includes setting information receiving section 406 and PDCCH receiving section 407.

Setting information receiving section 406 reads information on the set DCI size included in the setting information transmitted from base station 300, and outputs the result to PDCCH receiving section 407.

When an R-PDCCH region is targeted for blind decoding, PDCCH receiving section 407 performs the blind decoding by defining the set DCI size received from setting information receiving section 406 as the decoding unit. On the other hand, when a PDCCH region is targeted for blind decoding, PDCCH receiving section 407 performs the blind decoding by defining each size of two set DCI formats (e.g., DCI 0/1A and DCI 1) as the decoding unit.

According to the present embodiment described above, setting section 301 sets a DCI size (i.e., the number of configuration bits) of when DCI is transmitted in an R-PDCCH region as the same size for all terminals existing in the same cell, and PDCCH generating section 304 adds padding bits to the DCI transmitted in the R-PDCCH region until the size of the DCI reaches the set DCI size.

Consequently, the size of DCI transmitted in the R-PDCCH region, are common to all terminals, and therefore the possibility that the DCI is correctly decoded increases even when DCI addressed to another terminal is transmitted in the R-PDCCH region. In other words, the performance of error detection in R-PDCCH with higher probability of occurrence of false detection than PDCCH can be improved, and therefore the probability of occurrence of false alarm in the whole system can be effectively decreased.

When the DCI size set at setting section 301 is smaller than the size of the DCI format set at each terminal 400, control section 102 may reduce the bit number of an RB allocation field or MCS field to thereby set the DCI size to the set DCI size.

Although the above explanation has defined the set DCI size as a single size and the DCI formats as two types commonly set for PDCCH and R-PDCCH for each terminal, the DCI format may be set as a single type in the case of R-PDCCH. The former case can flexibly set a method of transmitting data (i.e., transmit diversity or non-contiguous RB allocation). However, the necessity of a padding process results in increasing the number of bits of DCI. In contrast, the latter case can reduce the number of bits of DCI. However, the flexibility of setting the method of transmission is deteriorated.

The process of adjusting the DCI size according to the present embodiment can be applied to base stations 100 of Embodiments 1 to 3.

Especially, when the process is applied to Embodiment 1, adjusting the number of configuration bits forming virtual CRC (i.e., using the virtual CRC as the padding bits of the present embodiment) can determine the DCI size as the set DCI size. Consequently, the false detection of the control information can be further decreased.

Other Embodiments (1) In the above each embodiment, a known bit (i.e., virtual CRC) may be added only to specific DCI formats (i.e., control information formats). For example, the virtual CRC may be added only to DCI formats other than DCI 0/1A. Since being a format common to all terminals, DCI 0/1A has high possibility of succeeding in the decoding of convolutional coding, and thus the probability of occurrence of false detection is low. In contrast, since depending on transmission modes, the DCI formats other than DCI 0/1A have high probability that the formats set for another terminal and the terminal are different, and thus have high probability of occurrence of the false detection. Consequently, adding the virtual CRC only to the DCI formats having higher probability of false detection can minimize an increase in overhead.

(2) In the above each embodiment, virtual CRC need not be inserted in DCI transmitted in C-SS when C-SS is also defined in an R-PDCCH region. This is because DCI formats transmitted in C-SS are limited, therefore there is high probability that the formats set for another terminal and the terminal are the same, and the probability of occurrence of false detection is low.

(3) In the above each embodiment, the same effect as Embodiment 1 can be acquired by increasing the number of CRC bits instead of adding virtual CRC. When DCI is transmitted in an R-PDCCH region, CRC bits may be separately added to the DCI.

(4) In the above each embodiment, RNTI such as cell-radio network temporary identifier (C-RNTI), may be used as a terminal ID.

(5) The expression "DCI format common to all terminals" described, in the above each embodiment may be read as "DCI format not depending on a transmission mode."

(6) Although DCI 0/1A has been explained as a format not depending on a transmission mode, the above each embodiment is not limited to this and any format used without depending on the transmission mode may be possible.

Alternatively, a DCI format other than DCIs 1, 2, 2A, 2B, 2C, 2D, 0A, and 0B may be used as a format depending on a transmission mode.

The transmission mode of uplink or downlink may include contiguous band allocation transmission. In a terminal in which this transmission mode is set, DCI formats depending on transmission modes in uplink and downlink are DCI 0 and DCI 1A, respectively. In this case, the DCI format common to all terminals is the same as the formats depending on the transmission modes, and therefore, in UE-SS, blind decoding may be performed on each type of formats in uplink and downlink. When both of uplink and downlink adopt the contiguous band allocation, the blind decoding is performed only on a single type of format in total.

Setting DCI 0/1A to DCI depending on a transmission mode and having a wider search space can prevent an increase in a block rate for a terminal for which PDCCH can be allocated in only DCI 0/1A due to originally poor condition of a propagation path.

(7) CCE and R-CCE explained in the above each embodiment are logical resources. When the CCE and the R-CCE are arranged in an actually physical, time-frequency resource, the CCE is arranged in a distributed manner all over the bands, and the R-CCE is arranged in a distributed manner in specific RBs. Alternatively, the same effect as that of the claimed invention can be acquired according to another method of arrangement.

(8) R-PDCCH in the above each embodiment may be referred to as enhanced-PDCCH (E-PDCCH).

(9) In the above each embodiment, instead of R-PDCCH, any control channel transmitted through a frequency resource that may be used for transmitting data can be used to acquire the same effect by applying the claimed invention.

(10) Although the claimed invention has been described above with embodiments using antennas, the claimed invention is equally applicable to antenna ports.

The antenna port indicates a logical antenna formed by one or multiple physical antennas. In other words, the antenna port is not limited to represent one physical antenna, and may include an array antenna formed by a plurality of antennas, for example.

For example, in 3GPP LTE, the number of physical antennas for forming the antenna port is not defined, and the antenna port is defined as a minimum unit by which a base station can transmit different reference signals.

The antenna port may also be defined as a minimum unit for multiplying weighting of a precoding vector.

(11) In the above explained PDCCH region, reference signals and the other control channels such as PHICH and PCFICH, other than PDCCH may be transmitted.

(12) Although the above each embodiment has been explained using a case where the claimed invention is implemented with hardware, as an example, the claimed invention can be implemented with software.

(13) Each function block employed in the explanation of the above each embodiment may typically be implemented as an LSI constituted by an integrated circuit. These function blocks may be individual chips or partially or totally contained on a single chip. The term "LSI" is adopted herein but this may also be referred to as "IC," "system LSI," "super LSI," or "ultra LSI," depending on the differing extents of integration.

The method of implementing integrated circuit is not limited to LSI, and implementation by means of dedicated circuitry or a general-purpose processor may also be possible. After LSI manufacture, utilization of a field programmable gate array (FPGA) or a reconfigurable processor where connections and settings of circuit cells in an LSI can be reconfigured is also possible.

If a new integrated circuit implementation technology replacing LSI is introduced because of advancement in semiconductor technology or a different technology derived therefrom, the function blocks may of course be integrated using that technology. For example, application of biotechnology is possible.

The disclosure of Japanese Patent Application No. 2010-197765, filed on Sep. 3, 2010, including the specification, drawings and abstract, is incorporated herein by reference in its entirety.

INDUSTRIAL APPLICABILITY

A base station, a terminal, a method of transmission, and a method of reception of the claimed invention are useful since they decrease false detection of control information and thus prevent reduction of system throughput.

REFERENCE SIGNS LIST 100, 300 Base station
101, 301 Setting section.
102 Control section
103 Search space setting section
104, 304 PDCCH generating section
105, 106, 107 Coding/modulating section
108 Allocation section
109 Multiplexing section
110, 213 IFFT section
111, 214 CP adding section
112, 215 RF transmitting section
113, 201 Antenna
114, 202 RF receiving section
115, 203 CP removing section
116, 204 FFT section
117 Extracting section
118 IDFT section
119 Data receiving section
120 ACK/NACK receiving section
131 Transmission region setting section
132 Transmission mode setting section
200, 400 Terminal
205 Demultiplexing section
206, 406 Setting information receiving section
207, 407 PDCCH receiving section
208 PDSCH receiving section
209, 210 Modulating section
211 DFT section
212 Mapping section

The invention claimed is:
1. A base station comprising:
a generation section that generates control information that includes a cyclic redundancy check (CRC) bit masked or scrambled by identification information of a terminal; and
a mapping section that maps the generated control information in a Relay-Physical Downlink Control Channel

(R-PDCCH) resource region available to both the control channel and a data channel, wherein the generation section adds a known bit known by the terminal to the control information when using the R-PDCCH resource region for transmitting the control information, and the known bit is added to the control information when the control information is other than DCI 0 or DCI 1A and the known bit is not added to the control information when the control information is DCI 0 or DCI 1A.

2. The base station according to claim 1, wherein the control information comprises a plurality of fields, and the known bit is included in specific one of the plurality of fields.

3. The base station according to claim 2, wherein the known bit is included in the specific field that notifies the terminal of a resource block (RB) allocated as the data channel.

4. The base station according to claim 2, wherein the known bit is included in the specific field that notifies the terminal of a modulation and coding scheme.

5. The base station according to claim 1, wherein the generation section adds a padding bit such that the control information has a certain bit size.

6. A terminal comprising:

a reception section that receives control information in a Relay-Physical Downlink Control Channel (R-PDCCH) resource region available to both the control channel and a data channel, the control information including a cyclic redundancy check (CRC) bit masked or scrambled by identification information of a destination terminal, the control information further including a predetermined bit when the R-PDCCH resource region is used for transmitting the control information and the control information further not including the predetermined bit when the R-PDCCH resource region is not used for transmitting the control information; and a determination section that determines, when receiving the control channel in the R-PDCCH resource region, that the control information is addressed to the terminal when the predetermined bit is the same as a known bit known by the terminal, wherein the control information includes the predetermined bit when the control information is other than DCI 0 or DCI 1A and wherein the control information does not include the predetermined bit when the control information is DCI 0 or DCI 1A, and the determination section determines, when receiving the control information other than DCI 0 or DCI 1A and when the predetermined bit is the same as a known bit known by the terminal, that the control information is addressed to the terminal, and the determination section determines, when receiving control information of DCI 0 or DCI 1A and when the predetermined bit is not the same as the known bit, that the control information is not addressed to the terminal.

7. The terminal according to claim 6, wherein the control information comprises a plurality of fields, and the known bit is included in specific one of the plurality of fields.

8. The terminal according to claim 7, wherein the known bit is included in the specific field that notifies the destination terminal of a resource block (RB) allocated as the data channel.

9. The terminal according to claim 7, wherein the known bit is included in the specific field that notifies the destination terminal of a modulation and coding scheme.

10. A method of transmission comprising:

generating control information that includes a cyclic redundancy check (CRC) bit masked or scrambled by identification information of a terminal; and mapping the generated control information in a Relay-Physical Downlink Control Channel (R-PDCCH) resource region available to both the control channel and a data channel, wherein a known bit known by the terminal is added to the control information when using the R-PDCCH resource region for transmitting the control information, and the known bit is added to the control information when the control information is other than DCI 0 or DCI 1A and the known bit is not added to the control information when the control information is DCI 0 or DCI 1A.

11. A method of reception comprising:

receiving control information in a Relay-Physical Downlink Control Channel (R-PDCCH) resource region available to both the control channel and a data channel, the control information including a cyclic redundancy check (CRC) bit masked or scrambled by identification information of a destination terminal, the control information further including a predetermined bit when the R-PDCCH resource region is used for transmitting the control information and the control information further not including the predetermined bit when the R-PDCCH resource region is not used for transmitting the control information; and determining, when receiving the control channel in the R-PDCCH resource region, that the control information is addressed to the terminal when the predetermined bit is the same as a known bit known by the terminal, wherein the control information includes the predetermined bit when the control information is other than DCI 0 or DCI 1A and wherein the control information does not include the predetermined bit when the control information is DCI 0 or DCI 1A, and the determining further comprises determining, when receiving the control information other than DCI 0 or DCI 1A and when the predetermined bit is the same as a known bit known by the terminal, that the control information is addressed to the terminal, and determining, when receiving control information of DCI 0 or DCI 1A and when the predetermined bit is not the same as the known bit, that the control information is not addressed to the terminal.

12. The base station according to claim 1, wherein the generation section does not add the known bit to the control information when not using the R-PDCCH resource region for transmitting the control information.

13. The terminal according to claim 6, wherein the determination section determines, when not receiving the control channel in the R-PDCCH resource region and when the predetermined bit is not the same as the known bit, that the control information is not addressed to the terminal.

14. The method of transmission according to claim 10, wherein the known bit is not added to the control information when not using the R-PDCCH resource region for transmitting the control information.

15. The method of reception according to claim 11 further comprising:

determining, when not receiving the control channel in the R-PDCCH resource region and when the predetermined bit is not the same as the known bit, that the control information is not addressed to the terminal.

* * * * *